(12) United States Patent
Cohen et al.

(10) Patent No.: US 9,329,991 B2
(45) Date of Patent: May 3, 2016

(54) TRANSLATION LAYER PARTITIONED BETWEEN HOST AND CONTROLLER

(71) Applicant: Seagate Technology LLC, Cupertino, CA (US)

(72) Inventors: Earl T. Cohen, Cupertino, CA (US); Sumit Puri, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 246 days.

(21) Appl. No.: 14/060,799

(22) Filed: Oct. 23, 2013

(65) Prior Publication Data

US 2014/0208004 A1    Jul. 24, 2014

Related U.S. Application Data

(60) Provisional application No. 61/893,383, filed on Oct. 21, 2013, provisional application No. 61/888,681, filed on Oct. 9, 2013, provisional application No. 61/873,357, filed on Sep. 3, 2013, provisional application No. 61/866,672, filed on Aug. 16, 2013, provisional application No. 61/755,169, filed on Jan. 22, 2013.

(51) Int. Cl.
*G06F 3/00* (2006.01)
*G06F 12/02* (2006.01)
*G06F 12/12* (2016.01)
*G06F 3/06* (2006.01)

(52) U.S. Cl.
CPC ............ *G06F 12/0246* (2013.01); *G06F 3/064* (2013.01); *G06F 12/121* (2013.01); *G06F 2212/401* (2013.01); *G06F 2212/7201* (2013.01)

(58) Field of Classification Search
CPC ............................... G06F 12/121; G06F 3/064
See application file for complete search history.

(56) References Cited

U.S. PATENT DOCUMENTS

| | | | |
|---|---|---|---|
| 5,943,692 A | 8/1999 | Marberg et al. | 711/203 |
| 8,151,082 B2 | 4/2012 | Flynn et al. | 711/202 |
| 8,195,912 B2 | 6/2012 | Flynn et al. | 711/202 |
| 2009/0222596 A1* | 9/2009 | Flynn et al. | 710/22 |
| 2012/0030408 A1 | 2/2012 | Flynn et al. | 711/102 |
| 2012/0185667 A1 | 7/2012 | Gandhi | 711/203 |
| 2012/0265934 A1 | 10/2012 | Gupta | 711/114 |
| 2013/0117503 A1 | 5/2013 | Nellans et al. | 711/103 |

FOREIGN PATENT DOCUMENTS

WO    WO93/00635    7/1993    ............ G06F 12/02

* cited by examiner

*Primary Examiner* — Zachary K Huson
(74) *Attorney, Agent, or Firm* — Christopher P. Maiorana, PC

(57) ABSTRACT

A method for using a partitioned flash transition layer is disclosed. Step (A) receives, at an apparatus from a host, a write command having first write data. Step (B) generates second write data by compressing the first write data in the apparatus. The second write data generally has a variable size. Step (C) stores the second write data at a physical location in a nonvolatile memory. The physical location is a next unwritten location. Step (D) returns, from the apparatus to the host in response to the write command, an indication of the physical location.

20 Claims, 12 Drawing Sheets

| | | | |
|---|---|---|---|
| 1 | FP[22:0] REDUNDANCY BLOCK, DIE, AND PAGE | OFFSET[15:0] | LEN_M128[11:0] |
| 0 | 0 | OFFSET[15:0] | LEN_M128[11:0] |
| 0 | 1 | 0 | LEN_M128[11:0] |
| 0 | 1 | 1 | |

- UNCOMPRESSED, 1010
- SAME FP, 1020
- OFFSET == PREVIOUS OFFSET + PREVIOUS LEN_M128 + 128, 1030
- OFFSET == PREVIOUS OFFSET + PREVIOUS LEN_M128 + 128 AND LEN_M128 MATCHES PREVIOUS, 1040

TRANSLATION LAYER PARTITIONED BETWEEN HOST AND CONTROLLER

This application relates to U.S. Provisional Application No. 61/893,383, filed Oct. 21, 2013, U.S. Provisional Application No. 61/888,681, filed Oct. 9, 2013, U.S. Provisional Application No. 61/873,357, filed Sep. 3, 2013, U.S. Provisional Application No. 61/866,672, filed Aug. 16, 2013, and U.S. Provisional Application No. 61/755,169, filed Jan. 22, 2013, each of which are hereby incorporated by reference in their entirety.

This application relates to U.S. Ser. No. 13/053,175, filed Mar. 21, 2011, which relates to U.S. Provisional Application No. 61/316,373, filed Mar. 22, 2010, each of which are hereby incorporated by reference in their entirety.

This application also relates to International Application PCT/US2012/058583, with an International Filing Date of Oct. 4, 2012, which claims the benefit of U.S. Provisional Application No. 61/543,707, filed Oct. 5, 2011, each of which are incorporated by reference in their entirety.

This application relates to U.S. Ser. No. 13/936,010, filed Jul. 10, 2013, which relates to International Application PCT/US2012/049905, with an International Filing Date of Aug. 8, 2012, which claims the benefit of U.S. Provisional Application No. 61/531,551, filed Sep. 6, 2011, and U.S. Provisional Application No. 61/521,739, filed Aug. 9, 2011, each of which are incorporated by reference in their entirety.

FIELD OF THE INVENTION

The invention relates to computing host and input/output device technology generally and, more particularly, to a method and/or apparatus providing a transition layer partitioned between a host and a controller.

BACKGROUND

Conventional solid-state drives store a fixed, integer number of host logical blocks in each page of a nonvolatile memory. Storage efficiency issues arise when either a user data size or a usable size of each page of the nonvolatile memory is not fixed. Architectures for variable size flash transition layers in the solid-state drives are hardware intense. Page headers are used to identify where the user data is stored among multiple read units within the pages of the solid-state drive, and extracting the data involves first reading and parsing the page headers.

SUMMARY

The invention concerns a method for using a partitioned flash transition layer. Step (A) receives, at an apparatus from a host, a write command having first write data. Step (B) generates second write data by compressing the first write data in the apparatus. The second write data generally has a variable size. Step (C) stores the second write data at a physical location in a nonvolatile memory. The physical location is a next unwritten location. Step (D) returns, from the apparatus to the host in response to the write command, an indication of the physical location.

BRIEF DESCRIPTION OF THE FIGURES

Embodiments of the invention will be apparent from the following detailed description and the appended claims and drawings in which:

FIG. 10 is an illustration of selected details of an embodiment of various compressed map entries;

DETAILED DESCRIPTION OF THE EMBODIMENTS

Figure 1:
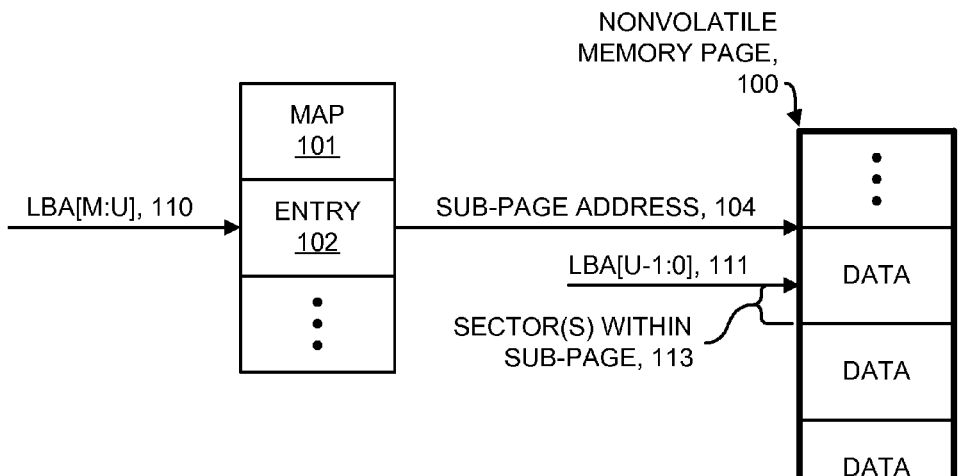
FIG. 1 is an illustration of selected details of an embodiment of mapping of a logical block address to fixed-sized regions within a nonvolatile memory page.

Embodiments of the invention include providing a transition layer partitioned between a host and a controller that may (i) support a wide range of data sizes, (ii) operate with non-block based data, (iii) return a handle to a host in response to writing the data, (iv) utilize the handle to read the data and/or (v) be implemented as one or more integrated circuits and/or associated firmware.

A host is coupled to an input/output device (such as a solid-state drive (e.g., SSD) controller), and the input/output device is coupled to and/or includes a nonvolatile memory (e.g., NVM). Examples of a host include a computing host, a server, a personal computer, a laptop computer, a notebook computer, a workstation computer, a personal digital assistant, a smartphone, a cellular handset, a media player or recorder, an input/output controller, a redundant array of inexpensive/independent disks (e.g., RAID)-on-chip (e.g., ROC) controller, and any other devices comprising a processor or computer. The host originates requests to access (e.g., to read or to write) the nonvolatile memory via the input/output device, and the requests are performed by a combination of the host (e.g., at least in part by software running on the host) and by the input/output device (e.g., at least in part by firmware running on the input/output device).

In some embodiments, flash translation layers (e.g., FTLs) map (or translate) logical block addresses (e.g., LBAs) in a logical block address space (such as used by a host to perform input/output operations to an input/output device) to physical locations (e.g., physical storage addresses in a physical address space) in a nonvolatile memory, such as a NAND flash nonvolatile memory. According to various embodiments, mapping of a logical block address in a logical block address space is via one or more of: a one-level map; a two-level map; a multi-level map; a direct map; an associative map; a hash table; a B-tree; a trie; a cache of a portion of the map; and any other means of associating the logical block addresses with the physical locations in the nonvolatile memory. In further embodiments, the map comprises a plurality of entries, such as one entry for each logical block address in the logical block address space.

In other embodiments, flash transition layers map labels or other unique identifiers of respective data to physical locations in a nonvolatile memory. For example, the label could be a hash (such as a SHA-256 or SHA-512 hash) of the respective data, or an object identifier of a respective object stored as or in the respective data, or a file system identifier (such as an mode) of the respective data (where the respective data is a file system object). According to various embodiments, mapping of labels or other unique identifiers of respective data is via one or more of: a one-level map; a two-level map; a multi-level map; a direct map; an associative map; a hash table; a B-tree; a trie; a cache of a portion of the map; and any other means of associating the labels or other unique identifiers within the physical locations of the nonvolatile memory. In further embodiments, the map comprises a plurality of entries, such as one entry for each extant label or other unique identifier. In still further embodiments, the map is dynamic in size and grows or shrinks as the number of extant labels or other unique identifiers increases or decreases. In an example, the size of the map grows or shrinks linearly as the number of extant labels or other unique identifiers increases or decreases. In another example, the size of the map grows or shrinks step-wise (in discrete chunks) as the number of extant labels or other unique identifiers increases or decreases by more than a respective threshold.

In various embodiments, a multi-level map is used to provide unique identifiers and/or to limit a range of the unique identifiers. For example, a label is looked up in a first associative map to produce a unique identifier that is shorter in length than the label. The unique identifier is then looked up in a second map to produce a physical location in the nonvolatile memory. In further embodiments, the second map is a plurality of maps, such as one map for each of a plurality of physically separate portions (e.g., present in different solid-state disks) and/or functionally different portions (e.g., different types) of the nonvolatile memory.

Each of a plurality of labels (or handles or logical block addresses or identifiers or other similar terms) generally corresponds to a respective data object (or sector or block or item or other similar terms), and the flash transition layer associates each of the labels with a physical location in the nonvolatile memory of the corresponding data object. The association of the label and the physical location in the nonvolatile memory of the corresponding data object is said to be via a map, irrespective of how the association is performed. While various examples herein use mapping of logical block addresses and other examples use mapping of object labels or object identifiers, many similar data labeling techniques along with associated mapping techniques are usable in the spirit of the teachings herein.

The term "mapping unit" as used herein refers to a size of the data objects being mapped by the flash transition layer. In some embodiments, the mapping unit is a fixed size, while in other embodiments, the data objects are variable in size (and the mapping units are thus not fixed in size).

In some embodiments, the mapping operates on aligned units of one or more logical sectors or blocks. Each mapping unit is an aligned unit of one or more logical sectors or blocks. Each mapping unit has a corresponding physical location where data of the mapping unit is stored (including the possibility of a NULL physical location if the mapping unit has never been written or is trimmed). For example, with 4 kilobyte (e.g., KB) mapping units, eight contiguous (and typically eight-sector aligned) Serial Advanced Technology Attachment (e.g., SATA) 512 byte sectors are mapped as a single unit. Generally, a map for logical block addresses has one entry per mapping unit to store a respective translation from the logical block address associated with the mapping unit to a physical address in the nonvolatile memory and/or other control information.

In various embodiments, a size of the data objects being mapped (the size of each mapping unit) and/or a size of the data objects as stored in the nonvolatile memory varies. In an example, each of the entries in the map stores a size of the respective data object. Continuing the example, in a key/value store, a label used to access an entry of the map is stored according to the key, and the value is a respective data object, the value varying in size among different ones of the keys. In another example, each of the entries in the map stores an indication of an amount of the nonvolatile memory to read to retrieve the stored data object. In a variation of the other example, the amount of the nonvolatile memory specified by an entry of the map comprises headers that locate the respective stored data object among one or more stored data objects or portions thereof in the amount of the nonvolatile memory specified by the entry of the map. In another variation of the other example, the amount of the nonvolatile memory to read to retrieve the respective data object specifies the exact size and location of the respective stored data object in a page of the nonvolatile memory, but irrespective of the nonvolatile memory error correction. Additional computations are used to determine a larger amount of the nonvolatile memory to read to retrieve both the respective stored data object and other information sufficient to perform error correction on the data read from the nonvolatile memory.

According to various embodiments, the nonvolatile memory is one or more of: NAND flash storing one (e.g., single-level cell), two (e.g., multi-level cell), three (e.g., triple-level cell), or more bits per cell, and being planar (2-dimensional) or three-dimensional (e.g., 3D); NOR flash; any other type of flash memory or electrically erasable memory; phase change memory (e.g., PCM); magnetic random access memory (e.g., MRAM); racetrack memory; resistive random access memory (e.g., ReRAM); a battery-backed static random access memory (e.g., SRAM) or dynamic random access memory (e.g., DRAM); any magnetic or optical storage media; or any other nonvolatile memory.

In some embodiments, the nonvolatile memory is organized in one more groups, such as by being physically segregated in different input/output devices (e.g., in different solid-state disks), or by having different physical locations or access mechanisms (e.g., one portion of the nonvolatile memory is NAND flash, and a second portion is phase change memory). In some of the embodiments, the map is a global map where each entry specifies an input/output device identification (e.g., ID) and a physical location in that input/output device. In other embodiments, the map is partitioned into multiple portions, such as one portion per input/output device and a higher-level map and/or a function of the respective label determines a selected one of the input/output devices.

Some nonvolatile memories such as NAND flash provide a writeable (or programmable) unit called a nonvolatile memory page (or a flash page when referring, for example, to NAND flash). A nonvolatile memory page is generally the smallest writable unit of the nonvolatile memory. In some embodiments and/or usage scenarios, a nonvolatile memory page comprises a number of user (non-error correction code) data bytes and an amount of spare space for meta-data and error correction coding (e.g., ECC). Typical NAND flash page sizes are 8 KB or 16 KB or 32 KB of user data, whereas typical mapping unit sizes for logical block addresses are 4 KB or 8 KB. (While the term "user" data is used with respect to the nonvolatile memory pages, some nonvolatile memory pages store "system" data such as map data and/or checkpoint data. User data is intended to refer in general to non-error correction coding portions of a nonvolatile memory page.) The NAND flash pages are organized into blocks, typically 128, 256, or 512 flash pages per block. A block is the minimum-sized unit that can be erased, and a NAND flash page is erased before the page is able to be (re)written.

Some nonvolatile memories such as NAND flash have multiple planes and/or banks, and permit "multi-plane" operations that access (read or program or erase) a page and/or a block from each of two or more planes in parallel. Using multi-plane programming advantageously increases write bandwidth, and causes the basic unit of writing to be a multi-plane page rather than a single, one-plane page. The term nonvolatile memory page (or nonvolatile memory block) as used herein represents either a single nonvolatile memory page (or block) or a multi-plane nonvolatile memory page (or block) according to a manner in which the nonvolatile memory is used.

While the term "flash" translation layer (e.g., FTL) is used herein, a concept of a translation layer between logical and physical addresses is applicable to multiple types of nonvolatile memory. In an example, certain types of nonvolatile memory, such as NAND flash, are erased in large units before being rewritten. In another example, some types of nonvolatile memory are subject to wear, leading to wear-leveling (move data from more worn parts of the nonvolatile memory to less-worn parts). In still another example, new forms of hard disk magnetic recording, such as shingled magnetic recording, have an inability to overwrite previously-written data without erasing a much larger quantity of other data. In various embodiments, nonvolatile memory types that are coarse-grained or that have finite endurance benefit from a (flash) translation layer.

Referring to FIG. 1, an illustration of selected details of an embodiment of mapping of a logical block address to fixed-sized regions within a nonvolatile memory page is shown. Some traditional flash transition layers assume a number of user data bytes in a nonvolatile memory page (e.g., Nonvolatile Memory Page 100) is a power-of-two (and/or a multiple of the sector size), and divide the nonvolatile memory page into an integer number of mapping units (each shown as DATA in FIG. 1). For example, with 16 KB of user data per nonvolatile memory page and 4 KB mapping units, each nonvolatile memory page contains four mapping units, and the flash transition layer maps an address of each mapping unit (e.g., LBA[M:U] 110) to a respective nonvolatile memory page and one of the four mapping units within the respective nonvolatile memory page. That is, each map entry contains respective fields such as:

nonvolatile_memory page_address[n-1:0], mapping_unit_within_nonvolatile_memory_page[k-1:0]

where the nonvolatile memory_page_address refers to a unique nonvolatile memory page in the nonvolatile memory, and the mapping_unit_within_nonvolatile_memory_page refers to one of $2^k$ mapping-unit-size portions of each nonvolatile memory page (k being fixed for the entire nonvolatile memory). A sub-page address 104 is a combination of nonvolatile memory_page_address and mapping_unit_within_nonvolatile_memory_page. For sector-based (e.g., finer granularity than mapping unit) addressing, lower-order bits of the logical block address (e.g., LBA[U-1:0] 111) specify a sub-portion, such as a number of sectors (e.g., sector(s) within a sub-page 113) within the mapping unit.

Figure 2:
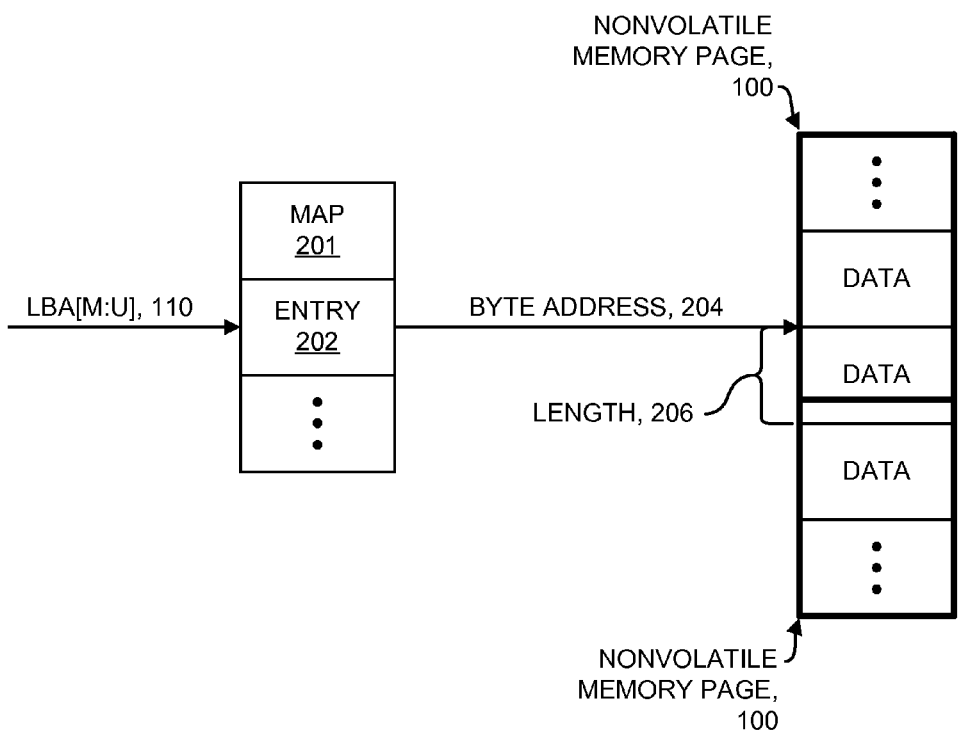
FIG. 2 is an illustration of selected details of an embodiment of mapping of a logical block address to a variable-sized region that optionally spans nonvolatile memory pages.

Referring to FIG. 2, an illustration of selected details of an embodiment of mapping of a logical block address to a variable-sized region that optionally spans nonvolatile memory pages is shown. Variable-size flash translation layers (e.g., VFTLs) conceptually map an address (or label) of a mapping unit (e.g., LBA[M:U] 110) to a variable-sized region of one or more nonvolatile memory pages (because, for example, data of the mapping unit is compressed prior to being stored in the nonvolatile memory, and/or because, in another example, the mapping units are written by the host as variable-sized pieces, such as for an object store). However, providing a complete byte address 204 and a byte data length 206 in each map entry makes the map entries large when compared with traditional flash transition layers.

Figure 3:
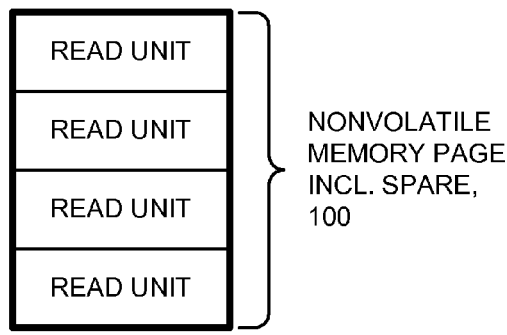
FIG. 3 is an illustration of an embodiment of a nonvolatile memory page comprising an integer number of read units.

Referring to FIG. 3, an illustration of an embodiment of a nonvolatile memory page comprising an integer number of read units is shown. In some embodiments, variable-size flash translation layers perform the mapping from addresses (or labels) of mapping units to physical addresses by mapping to an Epage (e.g., error correction coding page) address, also termed a "read unit" address. An Epage (or read unit) is the minimum amount of data that can be read from the nonvolatile memory and corrected by the error correction code used to protect contents of the nonvolatile memory. That is, each read unit contains an amount of data and corresponding error correction coding check bytes that protect that data. In some embodiments, a nonvolatile memory page (such as the nonvolatile memory page 100), or in other embodiments, a group of nonvolatile memory pages treated as a unit for purposes of writing, is divided into an integer number of read units, as illustrated in FIG. 3.

With some types of nonvolatile memory such as NAND flash, data stored in the nonvolatile memory is a mixture of user data bytes and error correction code bytes (error correction information), and a higher-level controller accessing the nonvolatile memory determines which bytes and how many of the bytes of the nonvolatile memory are used for user data, and which bytes and how many of the bytes of the nonvolatile memory are used for the error correction coding. In various embodiments, the number of read units per nonvolatile memory page is allowed to vary. For example, some portions of the nonvolatile memory use stronger error correction codes than others (using more bytes in the nonvolatile memory page for the error correction coding information), and have fewer read units and/or less usable data per read unit. In another example, the number of read units per nonvolatile memory page varies as the nonvolatile memory is used, since the program/erase cycles tend to weaken the nonvolatile memory, resulting in stronger error correction codes as the nonvolatile memory is used (worn) more.

According to various embodiments, the error correction code used is one or more of: a Reed-Solomon (e.g., RS) code; a Bose Chaudhuri Hocquenghem (e.g., BCH) code; a turbo code; a hard-decision and/or soft-decision low-density parity-check (e.g., LDPC) code; a polar code; a non-binary code; a redundant array of inexpensive/independent disks (e.g., RAID) code; an erasure code; any other error correction code;

any combination of the foregoing including compositions, concatenations, and interleaving. Typical codeword sizes range from 512 bytes (plus error correction coding bytes) to 2176 bytes (plus error correction coding bytes). Typical numbers of error correction coding bytes range from only a few bytes to several hundred bytes. In some multi-level cell NAND flash devices, error correction criteria are 40 bits per 1 KB of user data. In some multi-level cell NAND flash devices, code rates (a ratio of user bytes to total bytes in a read unit) are typically less than 94%. For example, an MLC NAND flash device has flash pages of size 17664 bytes, of which 16384 bytes are nominally used for storing mapped data, and 1280 bytes are "spare" bytes nominally used for storing meta-data and error correction coding bytes. A recommended error correction coding strength for the MLC NAND flash device is 40 bits of correction per 1 kilobyte, which uses 70 bytes of the spare bytes per 1 kilobyte of the mapped data bytes.

Figure 4:
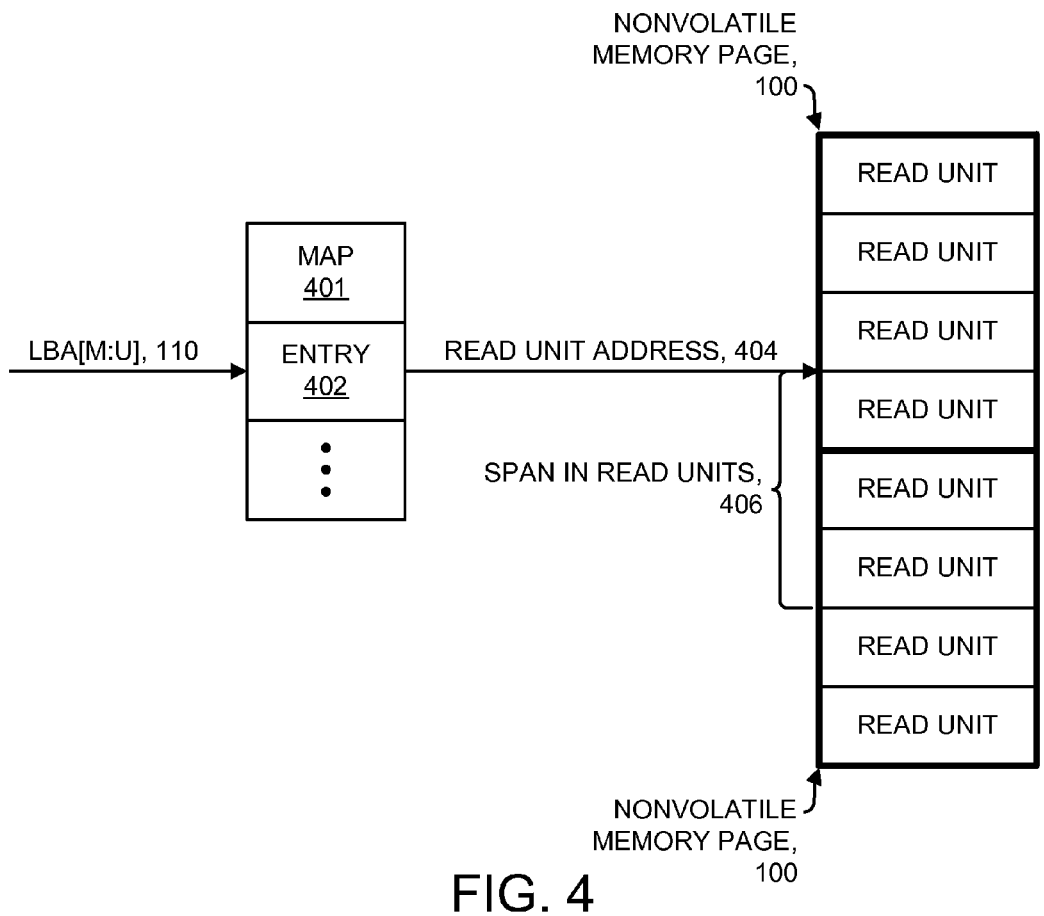
FIG. 4 is an illustration of selected details of an embodiment of mapping of a logical block address to a variable-sized region spanning one or more read units.

Referring to FIG. 4, an illustration of selected details of an embodiment of mapping a logical block address to a variable-sized region spanning one or more read units is shown. In some embodiments, VFTL mapping maps the address (or label) of a variable-sized (e.g., compressed) mapping unit (e.g., LBA[M:U] 110) to a number of read units, represented in each entry of the map as a read unit address 404 and a span (a number of read units) 406. The read units referenced by one of the map entries are in one or more (logically and/or physically) sequential nonvolatile memory pages, for example, the number of read units optionally and/or selectively cross a nonvolatile memory page boundary. In various embodiments that pack data within read units, an entry of the map alone is generally not sufficient to locate the associated data (as the entry only references the read units, and not a location of the data within the read units), and further information (such as headers) within the referenced read units is used to precisely locate the associated data.

In some embodiments, data is written into the nonvolatile memory pages in a manner that is striped across multiple dies of the nonvolatile memory. Striping write data across multiple dies advantageously enables greater write bandwidth by only writing a nonvolatile memory page into a given die once per stripe. A stripe of blocks across multiple dies is termed a redundancy block, because in further embodiments and/or usage scenarios, RAID-like redundancy is added on a redundancy block basis using, for example, one redundant die. In various embodiments, some blocks of the nonvolatile memory are defective and are skipped on writing, so that the striping occasionally has "holes" where one of the die is skipped (rather than writing into the nonvolatile memory pages of a bad block). In such embodiments, "sequential" nonvolatile memory pages are sequential in a logical order determined by an order in which the nonvolatile memory pages are written.

Figure 5:
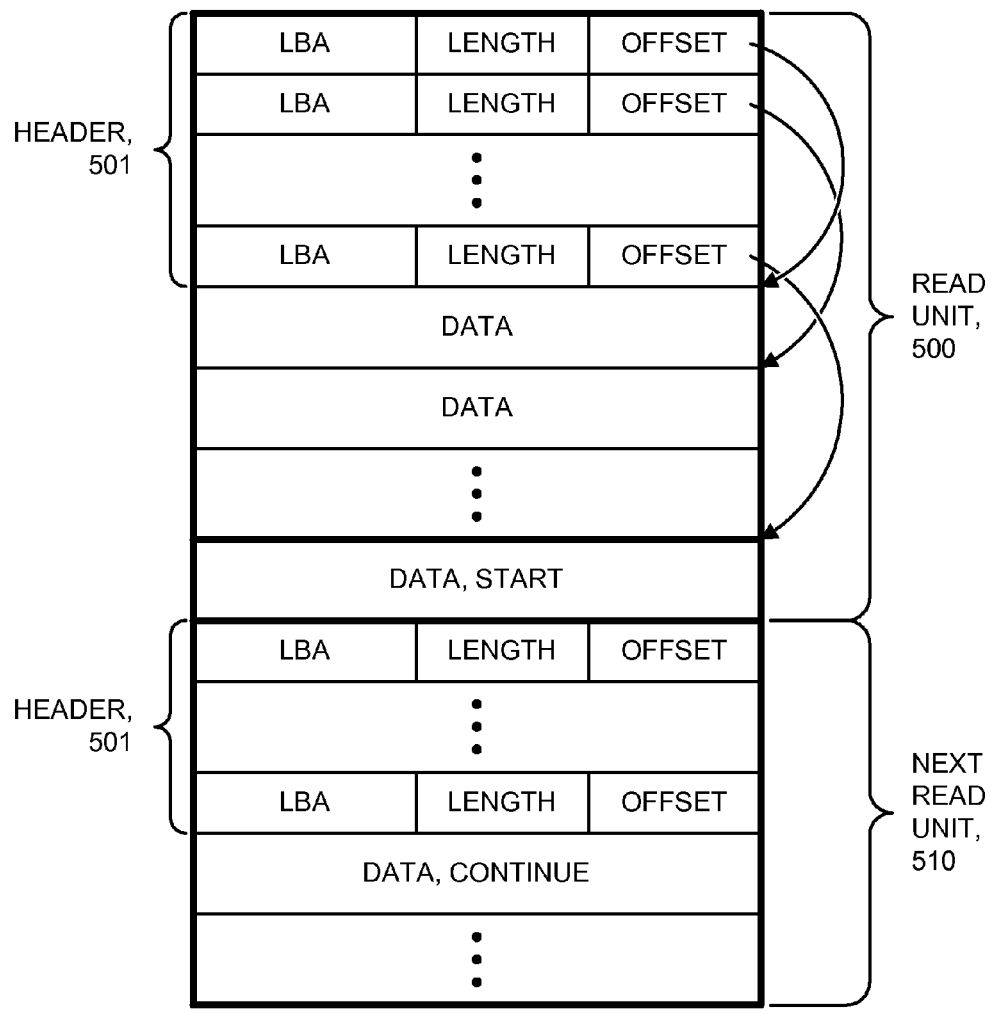
FIG. 5 is an illustration of selected details of an embodiment of a read unit comprising headers and data.

Referring to FIG. 5, an illustration of selected details of an embodiment of a read unit comprising headers and data is shown. In various embodiments, the mapping illustrated in FIG. 4 engenders a criterion to locate the variable-sized data within the read units. As illustrated in FIG. 5, each read unit (e.g., read units 500 and 510) has a set of zero or more headers 501, and the headers are written, typically by hardware, as the variable-sized data is "tiled" (e.g., densely packed without wasted space) into one or more read units. The headers are interpreted, typically by other hardware, to extract the variable-sized data when the nonvolatile memory is read. Variable-sized data is located by a respective offset and length in one of the headers having a matching logical block address (or label), and data optionally and/or selectively spans read units (such as the variable-sized data illustrated by "DATA, START" and "DATA, CONTINUE").

In various embodiments, the headers are also used as part of recycling (e.g., garbage collection and/or wear-leveling)-including the logical block address (or equivalently, the mapping unit address or label) in the headers both enables finding the variable-sized data within a read unit, and provides a way to determine when a particular one of the read units is read, if the variable-sized data within is still valid or has been overwritten (by looking up the logical block address, or label, in the map and determining if the map still references a physical address of the particular read unit, or has been updated to reference another one of the read units). Hence, the headers are said to form a "reverse map" in that the headers combined with a physical location of the read units have information similar to that in the map, but associated from physical location to logical block address (or label).

In some embodiments, dedicated hardware to extract data from the read units based on the logical block addresses (or labels) is implemented to operate with high efficiency for random reads. The dedicated hardware parses headers within one or more read units to find the one of the headers with a given logical block address (or label), and then uses the respective length and offset to extract the associated variable-sized data. However, a hardware-based solution is costly (in silicon area and power). For a low-end and/or mobile environment where sequential performance is more important than random performance, changes are implemented to the variable-size flash translation layer to reduce silicon area, save power, and achieve high sequential throughput rates.

In some embodiments, a sequential-read-optimized variable-size flash translation layer (e.g., SRO-VFTL) tiles (densely packed) data into the nonvolatile memory pages (or, in some embodiments, a group of nonvolatile memory pages treated as a unit for purposes of writing) without any gaps for headers within the data—all of the headers are grouped in one portion of the nonvolatile memory page. In further embodiments, the headers are not used dynamically to access data (as in some variable-size flash translation layers), but are only used for recycling and recovery, such as from unexpected power loss. Instead, entries of the map comprise complete information used to find variable-sized (e.g., compressed) data within the nonvolatile memory pages. Separating headers and data into different portions of the nonvolatile memory page leads to read units that comprise only headers, read units that comprise a mixture of headers and data (but, as in FIG. 6, only one such read unit per nonvolatile memory page), and read units that comprise only data.

While being configured for sequential read throughput at low cost, a sequential-read-optimized-variable-size flash translation layer is able to perform comparatively well on other metrics such as random read input/output operations per second (e.g., IOPs), random write input/output operations per second, and sequential write throughput. However, removal of hardware assists for functions such as VFTL-style data tiling with headers in each read unit places a larger burden on a control processor. Alternatively, in some embodiments, a sequential-read-optimized-variable-size flash translation layer uses hardware assists for data tiling, data extraction, or other operations.

Figure 6:
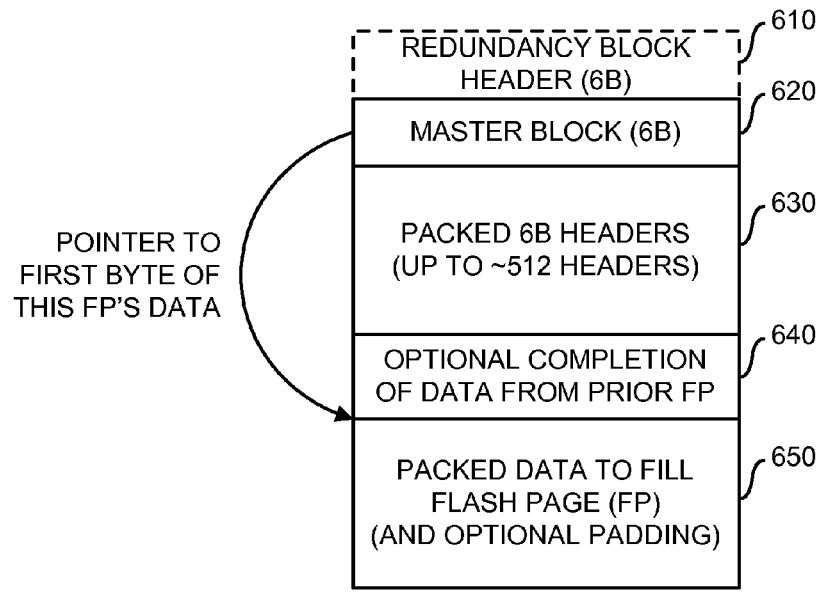
FIG. 6 is an illustration of selected details of an embodiment of a nonvolatile memory page comprising headers and data.
Figure 7:
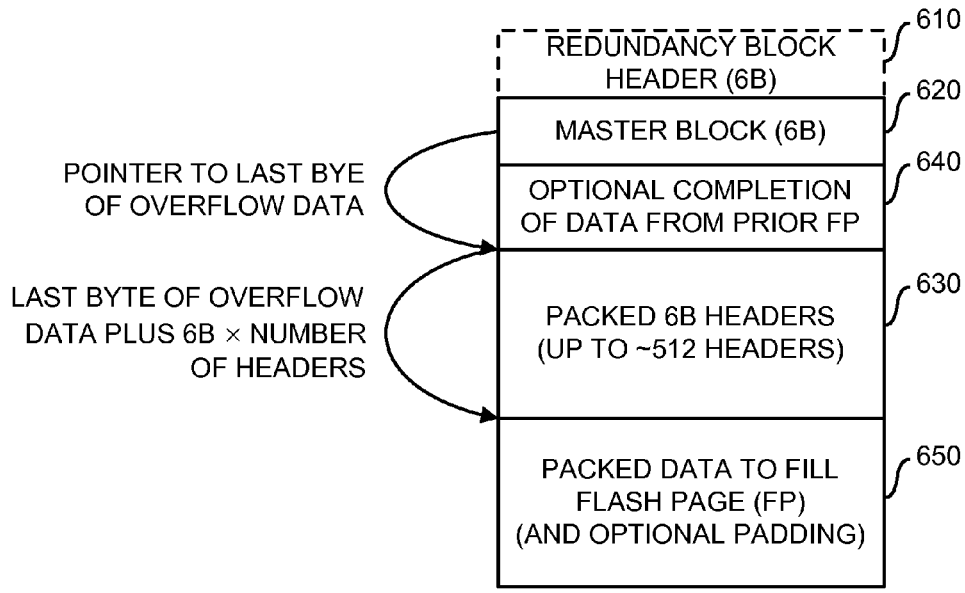
FIG. 7 is an illustration of selected details of another embodiment of a nonvolatile memory page comprising headers and data.

Referring to FIG. 6, an illustration of an embodiment of an SRO-VFTL nonvolatile memory page is shown. Referring to FIG. 7, an illustration of another embodiment of an SRO-VFTL nonvolatile memory page is shown. A difference between the embodiments of FIG. 6 and FIG. 7 is whether the continuation data from a previous nonvolatile memory page

640 is before or after the headers. Various embodiments and arrangements of the data within the nonvolatile memory page are contemplated.

According to various embodiments, a nonvolatile memory page comprises one or more of:
- Headers, including a master header 610, optionally and/or selectively a redundancy block header 620 (e.g., a header added in the first page of each block in a redundancy block), and zero or more additional packed headers 630. Every nonvolatile memory page has at least a count of the number of following headers and a pointer to where data (associated with the headers) starts in the nonvolatile memory page. In some embodiments, the headers may be byte-aligned, but are only 6 bytes (e.g., B) each. The headers may include, but are not limited to, data headers, epoch headers and padding. Data headers utilize a mapping unit address and a length. The offset is implied because all data is consecutively packed.
- Optionally and/or selectively continuation data from a previous nonvolatile memory page (a portion of variable-sized data of a mapping unit) 640.
- Packed (e.g., optionally and/or selectively compressed) data of one or more mapping units 650 to fill the nonvolatile memory page, the last of which optionally and/or selectively continues in a subsequent nonvolatile memory page.
- Optional padding at the end of the nonvolatile memory page (included in 650). In various embodiments, the data is byte-packed (e.g., no holes), though possibly padded at the end of the nonvolatile memory page if highly compressed (e.g., too many headers). Padding is, for example, used if: (i) the last variable-sized piece of data added to the nonvolatile memory page left fewer unused bytes than a size of a header (so a new header could not be added to begin another variable-sized piece of data) and (ii) optionally and/or selectively, a specified number of headers per nonvolatile memory page is exceeded (so the number of mapping units stored in the nonvolatile memory pages is limited by the specified number of headers and not by a size of data of the mapping units).

In some embodiments, recovery and/or recycling (e.g., garbage collection) with a sequential-read-optimized-variable-size flash translation layer is advantageously enabled to read and/or error correct and/or examine only a header portion of each of the nonvolatile memory pages, and not every read unit as in a non-sequential-read-optimized-variable-size flash translation layer. If recycling determines that data of a nonvolatile memory page may be rewritten, that data may also be read and may also be error corrected. In some embodiments, an entire nonvolatile memory page is read for recycling, but only the header portion is error corrected until a determination is made that some data in the nonvolatile memory page should be recycled.

In various embodiments, a number of headers per nonvolatile memory page is limited to bound a number of read units per nonvolatile memory page that may be read to ensure all the headers have been read from the nonvolatile memory. In the embodiment of FIG. 6, only a number of read units sufficient to contain the maximum number of headers are read. In the embodiment of FIG. 7, an additional number of read units are read to account for a largest size of data completing from a previous nonvolatile memory page (e.g., continuation data 640). The embodiment of FIG. 7, however, enables a number of read units to access the completion of data from a previous nonvolatile memory page (e.g., continuation data 640) to be determined from the associated map entry, as the number of bytes in the completion of data is determinable based on the respective offset and length of the associated map entry, and the number of bytes of user (non-error correction code) data in the previous nonvolatile memory page. Furthermore, the only headers prior to the completion of data are the optional redundancy block header (only present in specified nonvolatile memory pages, such as the first page in each block) and the master header (always present in each nonvolatile memory page). In the embodiment of FIG. 6, to read the completion of data without having to access nonvolatile memory twice, the maximum number of headers is assumed to be present (or the entire nonvolatile memory page is read).

In some embodiments, the sequential-read-optimized-variable-size flash translation layer uses a single-level map having a plurality of map entries. In other embodiments, the sequential-read-optimized-variable-size flash translation layer uses a multi-level map, such as a two-level map having a first-level map (e.g., FLM) pointing to second-level map (e.g., SLM) pages, where each of the second-level map pages comprises a plurality of leaf-level map entries. In further embodiments, the multi-level map has more than two levels, such as three levels. In some embodiments and/or usage scenarios, use of a multi-level map enables only a relevant (e.g., in use) portion of the map to be stored (e.g., cached) in local memory (e.g., on-chip SRAM of a solid-state drive controller, or local DRAM of a host), reducing a cost of maintaining the map. For example, if typical usage patterns have 1 gigabyte (e.g., GB) of the logical block address space active at any point in time, then only a portion of the map sufficient to access the active 1 GB portion of the logical block address space is locally stored for fast access versus being stored in the nonvolatile memory. References outside of the active portion of the logical block address space fetch requested portions of one or more levels of the multi-level map from the nonvolatile memory, optionally and/or selectively replacing other locally-stored portions of the map.

Each of the leaf-level map entries is associated with (corresponds to) an address (or label) of one of a plurality of mapping units. In an example, a logical block address is converted to a mapping unit address, such as by removing zero or more least-significant bits (e.g., LSBs) of the logical block address and/or adding a constant to the logical block address for alignment purposes, and the mapping unit address is looked up in the map to determine a corresponding entry of the map. In another example, a label is looked up in a hash table (or other associative data structure) to determine a unique identifier used as the mapping unit address.

Figure 8:
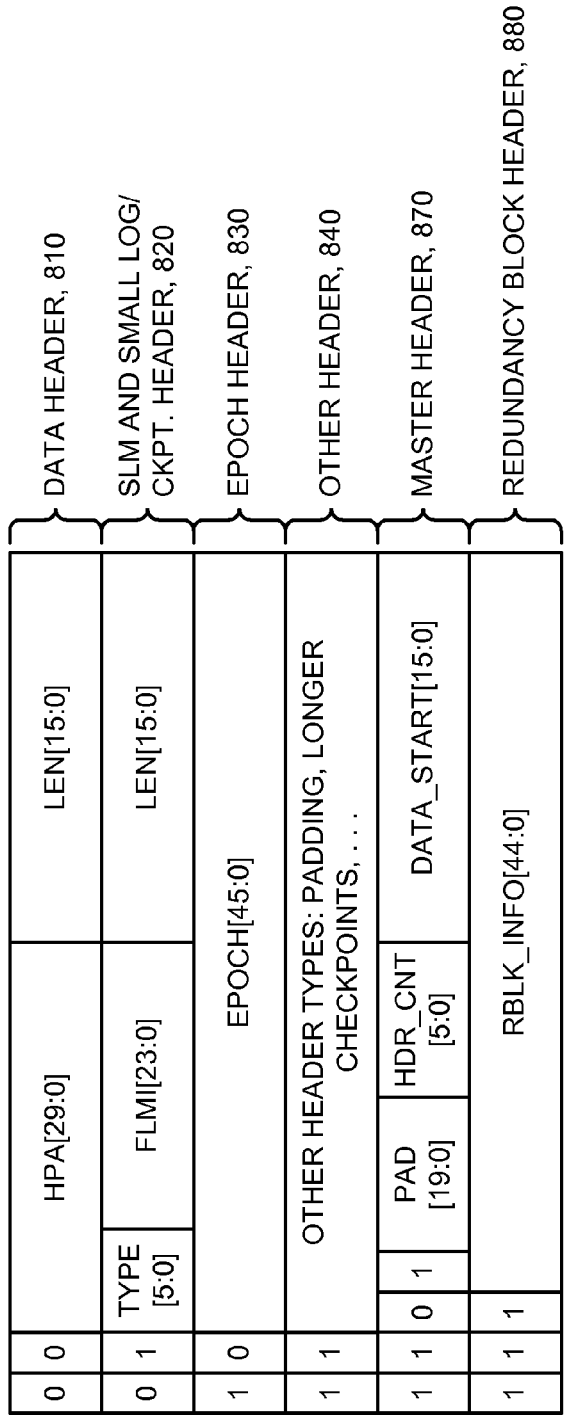
FIG. 8 is an illustration of selected details of an embodiment of various types of headers.

Referring to FIG. 8, an illustration of details of an embodiment of various types of headers is shown. In the example of FIG. 8, the headers have been formatted to fit in six bytes each. According to various embodiments, the various types of headers are one or more of: all of a same size; optionally and/or selectively of different sizes; each comprises a respective field specifying a size of the header; vary in size in different nonvolatile memory pages; and any combination of the foregoing.

According to various embodiments, the headers in the nonvolatile memory page comprise one or more of:
- Data headers (810) indicating information associated with a variable-sized data portion. In some embodiments, data associated with a data header starts in a same nonvolatile memory page as the data header appears. In further embodiments and/or usage scenarios, if a nonvolatile memory page only has remaining space for a data header, all of the associated data starts in a subsequent nonvolatile memory page.
- Map headers, such as second-level map (e.g., SLM) headers (820). The second-level map headers comprise a first-level map index (e.g., FLMI) to indicate (such as for second-level map recycling and/or recovery) which second-level map page is being stored.

Log/Checkpoint headers (820). Log/Checkpoint headers indicate data used for recycling, recovery, error handling, debugging, or other special conditions.

Epoch headers (830) are used as part of recovery to associate data with corresponding map/checkpoint information. Typically, there is at least one Epoch header per nonvolatile memory page.

Master headers (870) are used once per nonvolatile memory page to provide information as to a number of headers in the nonvolatile memory page and where non-header data starts within the nonvolatile memory page. Various techniques determine a start of non-header data, such as illustrated in the embodiments of FIG. 6 and FIG. 7.

Redundancy block headers (880) are used in certain nonvolatile memory pages, such as the first nonvolatile memory page in each block in a redundancy block.

Other types of headers (840), such as padding headers, checkpoint headers supporting larger lengths, etc.

In some embodiments, some headers comprise a TYPE field to provide multiple subtypes of the header. In various embodiments, some headers comprise a LEN (length) field containing a length of data associated with the header. In various embodiments, rather than or in addition to a LEN field, some headers comprise an OFFSET (offset) field (not shown) containing an offset (within the nonvolatile memory page) to the end of data associated with the header. (In some embodiments, if the last one of the variable-sized pieces of data spans a nonvolatile memory page, the OFFSET is an offset within a subsequent nonvolatile memory page or a number of bytes within the subsequent nonvolatile memory page.) Only one of a LEN field or an OFFSET field is generally implemented since with the variable-sized pieces of data packed with no wasted space, the starting location and ending location of each of the variable-sized pieces of data in a nonvolatile memory page is implied by the starting location of the first variable-sized pieces of data in the nonvolatile memory page (e.g., immediately after the headers as in FIG. 7), and the list of LEN or OFFSET fields.

Figure 9:
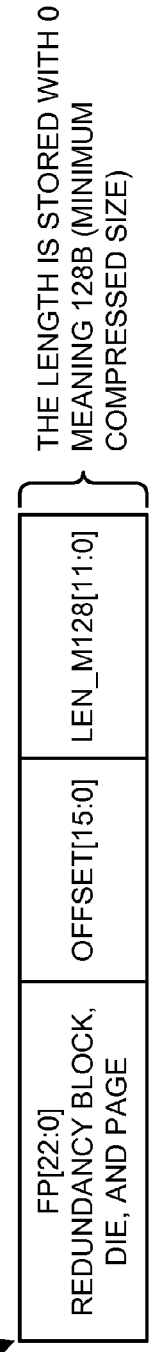
FIG. 9 is an illustration of selected details of an embodiment of a map entry.

Referring to FIG. 9, an illustration of selected details of an embodiment of a map entry 900 is shown. According to various embodiments, the entries of the map comprise one or more of:

A physical nonvolatile memory page address,
An offset within the nonvolatile memory page (e.g., OFFSET) to a variable-sized data item,
A length of the variable-sized data item (e.g., LEN_M128), and
Other control information.

In some embodiments, the length is encoded, for example by being offset such that a value of zero corresponds to a specified minimum length. For example, if the minimum length is 128 bytes, a LEN_M128 value of 0 represents 128 bytes. In further embodiments, data that is compressed to less than the specified minimum length is padded to be at least the specified minimum length in size.

In various embodiments, the SRO-VFTL map entries are larger than VFTL map entries since the SRO-VFTL map entries store a full offset and byte length of corresponding data. Accordingly, reducing a size of the map entries when stored in the nonvolatile memory may be advantageous. In a typical use, data is often sequentially read and written, at least with some granularity and/or an average number of sequential mapping units greater than one. A map entry compression format that takes advantage of the sequential nature of writing is also relatively inexpensive to implement and produces a high map compression rate. Compression of map entries is further aided by sequentially-written data going into the same nonvolatile memory pages, until a nonvolatile memory page boundary is crossed.

Referring to FIG. 10, an illustration of selected details of an embodiment of various compressed map entries is shown. The various map entries include uncompressed (1010), having a same nonvolatile memory page address as a previous map entry (1020), having a same nonvolatile memory page address as the previous map entry and starting at an offset where the previous data ended (1030), and having a same nonvolatile memory page address as the previous map entry, starting at an offset where the previous data ended, and having a same length as the previous map entry (1040).

In some embodiments having a multi-level map, a cache is maintained of lower-level (such as leaf-level) map pages. The cached map pages are in an uncompressed form, providing quick access by the processor (such as a host or a control processor of a solid-state drive controller). When map pages are moved (such as from nonvolatile memory or dynamic random access memory (e.g., DRAM)) into the cache, the map pages are uncompressed. When the map pages are flushed from the cache (such as due to being modified), the map pages are compressed for storage (such as in the nonvolatile memory). According to various embodiments in which DRAM is used to reduce latency by storing some or all of the map pages in the dynamic random access memory, the map pages in the dynamic random access memory are stored in one or more of: compressed form; uncompressed form; a selectively compressed or uncompressed form; and with an indirection table used to access the (variable-sized) compressed versions of the map pages in the dynamic random access memory.

In some embodiments, host write data of a host write command is optionally and/or selectively compressed as the host write data arrives at a solid-state drive controller, and stored in a first-in-first-out (e.g., FIFO)-like fashion in a local (such as an on-chip) memory. For example, in some embodiments the host write data is stored in a unified buffer (e.g., UBUF in FIG. 11A), along with firmware data structures, flash statistics, portions of the map (such as a cache holding one or more pages of the map), read data from the nonvolatile memory including recycling read data, headers of data to be written to the nonvolatile memory, software code, firmware code, and other uses. In various embodiments, one or more dedicated memories are used for various local storage criteria of the solid-state drive.

In some embodiments, host write data of a host write command is optionally and/or selectively compressed at a host prior to being sent to a solid-state drive controller. For example, database records are compressed by a host database prior to being written to an input/output device.

In various embodiments, with each mapping unit of data that arrives from the host, a control processor of the solid-state drive (e.g., central processing unit, CPU, in FIG. 11A) is notified of one or more of: a respective mapping unit address, a respective local memory address where data associated with the respective mapping unit address is stored, and/or a respective length of each mapping-unit of variable-sized (e.g., compressed) host data. The control processor is enabled to determine an order of writing of the nonvolatile memory pages, and a total number of non-error correction coding bytes available in each of the nonvolatile memory pages. According to the total number of non-error correction coding bytes available in a given one of the nonvolatile memory pages, the control processor is enabled to determine an amount of headers and an amount of data placed in the given nonvolatile memory page. For example, the control processor accumulates headers for the given nonvolatile memory page (and tracks a number of bytes of headers used so far), and adds variable-sized data of mapping units and headers to the given nonvolatile memory page one at a time until the given nonvolatile memory page is full. When the given nonvolatile memory page is full, a last portion of data of a final one of the mapping units added to the given nonvolatile memory page possibly did not fit in the given nonvolatile memory page, and is used as a data completion portion of a subsequent one of the nonvolatile memory pages (e.g., continuation data 640), reducing the total number of non-error correction coding bytes available in the subsequent nonvolatile memory page for new headers and data.

In some embodiments, at a particular point in time, zero or more nonvolatile memory pages are enabled to be filled with host write data, and zero or more nonvolatile memory pages are enabled to be filled with recycled data. For example, at least two bands (e.g., FIFO-like series of redundancy blocks) may be filled respectively, one band with "hot" data (e.g., fresh from the host) and the other band with "cold" data (e.g., recycled), and zero or more nonvolatile memory pages worth of space are allocated from a buffer to each band. Continuing the example, in various embodiments, the host write data is optionally and/or selectively enabled to be directed into either the hot band or the cold band, and the recycled data is optionally and/or selectively enabled to be directed into either the hot band or the cold band.

In some embodiments, the control processor is enabled to convert the series of respective mapping unit addresses, local memory addresses and respective lengths into one or more of: a series of headers to be written to a nonvolatile memory page as a header portion of the nonvolatile memory page; a first starting address and a first length of a sequential portion of the local memory to be written to the nonvolatile memory page as a user data portion of the nonvolatile memory page, the user data portion of the nonvolatile memory page comprising at least a portion of data of at least one mapping unit; a second starting address and a second length of a sequential portion of the local memory to be written to a subsequent nonvolatile memory page as a user data completion portion of the subsequent nonvolatile memory page, the user data completion portion comprising a portion of data of one mapping unit or being empty; a number of zero or more padding bytes to be written to the nonvolatile memory page, where the padding bytes are, for example, used if the user data completion portion is empty and the nonvolatile memory page is not full. Advantageously, the control processor is enabled to simply convert the series of respective mapping unit addresses, respective local memory addresses and respective lengths into the series of headers by reformatting, and to generate a small number of direct memory access (e.g., DMA) commands to transfer the portions comprising the nonvolatile memory page (the series of headers, a completion portion of a previous nonvolatile memory page, the user data portion, and any padding bytes) to the nonvolatile memory.

In various embodiments, compression of the host write data is optionally and/or selectively enabled. In an example, information of the host write command selectively enables compression. In another example, compression is selectively enabled as a function of a logical block address (or label) of the host write command. In yet another example, compression is selectively disabled if compression of the host write data did not reduce a size of the host write data. If compression is not enabled, the host write data is stored uncompressed. According to various embodiments, entries of the map indicate if the corresponding data is compressed or uncompressed by one or more of: a respective bit in each entry of the map; and/or a value of the length stored in each map entry. For example, if mapping units are 4 KB, a length of 4 KB in a map entry indicates that associated data of the map entry is uncompressed, whereas a length less than 4 KB indicates that the associated data is compressed. In some embodiments and/or usage scenarios, a header associated with the stored optionally and/or selectively compressed version of the host write data specifies whether or not the stored host write data is compressed.

In some embodiments, data is recycled by selecting a redundancy block to be recycled, reading nonvolatile memory pages of the redundancy block in an order in which the nonvolatile memory pages were written, processing solely read units that contain headers of the nonvolatile memory pages, looking up a logical block address (or equivalently a mapping unit address or label) of each header that is a data header in the map to see if the data is still valid, and if the data is still valid constructing appropriate new headers and DMA commands to assemble the data to be recycled as part of a new nonvolatile memory page. The new nonvolatile memory page is then written to the nonvolatile memory.

Figure 11A:
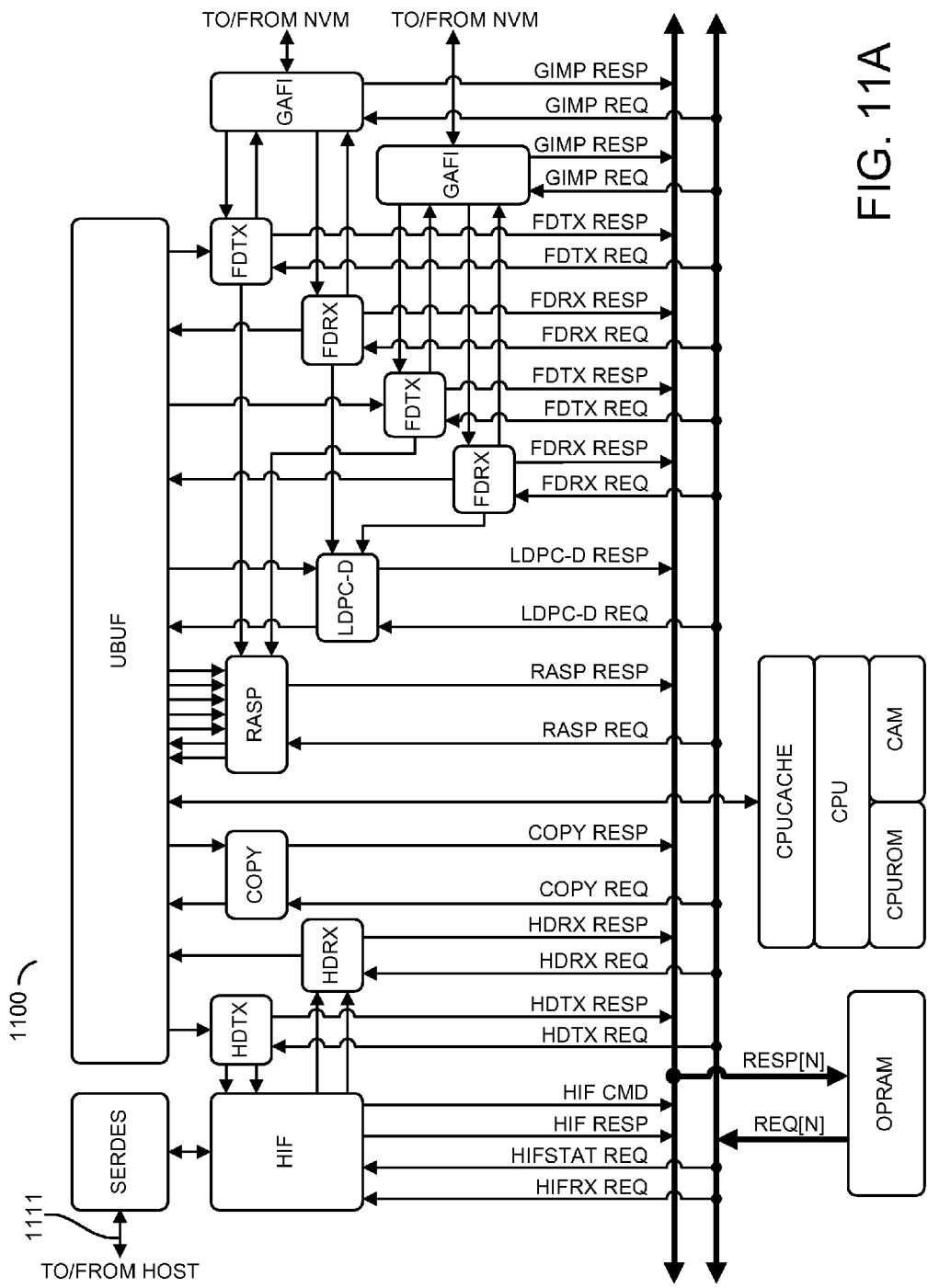
FIG. 11A is an illustration of selected details of an embodiment of a solid-state drive controller.

Referring to FIG. 11A, an illustration of selected details of an embodiment of a solid-state drive controller 1100 is shown. In some embodiments, the solid-state drive controller 1100 is enabled to implement one or more flash transition layers or portions thereof, such as by implementing the flash transition layer in cooperation with a host. In various embodiments, the controller 1100 may be implemented as one or more integrated circuits.

As illustrated in FIG. 11A, an input/output receiver, such as a SerDes (e.g., serializer-deserializer), of the solid-state drive controller 1100 is coupled to a host via external interface 1111. A host interface (e.g., HIF), via the SerDes, receives commands, such as read and write commands, receives write data, and sends read data. The commands are sent to a central processing unit via a shared memory (e.g., OpRAM). The central processing unit interprets the commands and controls other portions of the solid-state drive controller via the shared memory. For example, the central processing unit communicates DMA commands to and receives responses from various data path transmit and receive units, such as the host data path receive segment (e.g., HDRx) or a flash data path transmit segment (e.g., FDTx), via the shared memory.

Write data from the host interface is transferred via a host data path receive segment (e.g., HDRx) to a unified buffer (e.g., UBUF). In various embodiments, the host data path receive segment includes logic to optionally and/or selectively compress and/or encrypt the host write data. The optionally and/or selectively compressed and/or encrypted host write data is then sent from the unified buffer to the nonvolatile memory via a flash data path transmit segment and a generic flash interface (e.g., GAFI). In various embodiments, the flash data path transmit segment includes logic to perform encryption and/or scrambling and/or error correction encoding. In response to host read commands, data is read from the nonvolatile memory via the generic flash interface and sent to the unified buffer via a flash data path receive segment (e.g., FDRx). In various embodiments, the flash data path receive segment incorporates error correction decoding and/or decryption and/or de-scrambling. In other embodiments, a separate error correction decoder (e.g., LDPC-D to implement LDPC codes) is enabled to operate on "raw" data stored in the unified buffer by the flash data path receive segment. Decoded read data in the unified buffer is then sent to the host Interface via a host data path transmit segment (e.g., HDTx). In various embodiments, the host data path transmit segment includes logic to optionally and/or selectively decrypt and/or decompress the decoded read data. In some embodiments, a RAID-like and soft-decision processing unit (e.g., RASP) is enabled to generate RAID-like redundancy to additionally protect host write data and/or system data stored in the nonvolatile memory, and/or to perform soft-decision processing operations for use with the LDPC-D.

According to various embodiments, the solid-state drive controller is enabled to implement none, some, all, or portions of one or more flash transition layers. In an example, a higher-level mapping portion of the flash transition layer is performed on the host, and a lower-level mapping portion of the flash transition layer is performed in the solid-state drive controller. In another example, the solid-state drive controller sends and receives abstracted physical unit addresses, such as read unit addresses and spans, to and from the host, and the host maps logical block addresses (or labels) to the abstracted physical unit addresses. The solid-state drive controller is enabled to locate specific data associated with the abstracted physical unit addresses via an identifier of the specific data, such as a logical block address (or label), stored in a header. In still another example, mapping at the host of a logical block address (or a label) produces a nonvolatile memory page address, an offset within the nonvolatile memory page, and a byte length. The solid-state drive controller is enabled to determine a number of read units to access in the nonvolatile memory to retrieve the specified data within one or more nonvolatile memory pages. Advantageously, in one or more of the examples, details of error correction coding (e.g., a number of user data bytes per nonvolatile memory page or a size of read units) are maintained by the solid-state drive controller, reducing overhead on the host.

Figure 11B:
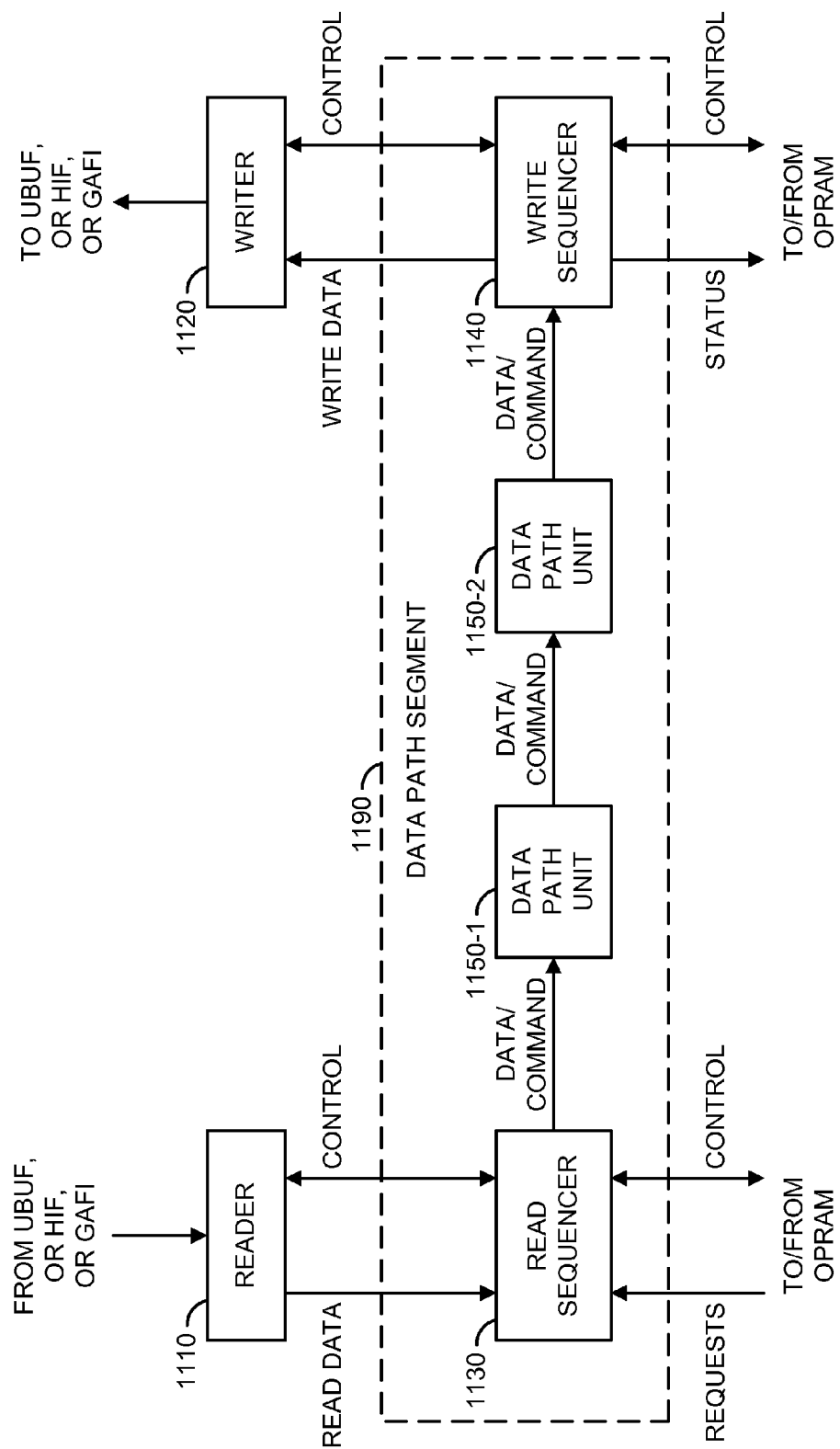
FIG. 11B is an illustration of selected details of an embodiment of a data path segment.

Referring to FIG. 11B, an illustration of selected details of an embodiment of a data path segment is shown. A data path segment 1190 may illustrate the host data path receive segment or the flash data path transmit segment of FIG. 11A. The data path segment 1190 comprises a read sequencer 1130, a write sequencer 1140, and zero or more data path units (e.g., DPUs). FIG. 11B illustrates an example with two data path units 1150-1 and 1150-2.

The read sequencer 1130 is coupled to the OpRAM (see FIG. 11A) to receive control information specifying data to be read/accessed. For example, the information may be an address and/or a length in the unified buffer or a command to a host interface or generic flash interface, and may specify commands to be intermixed with the data. The read sequencer 1130 is also coupled to a reader 1110 to read/access the data, such as from the UBUF, the host interface, or the generic flash interface. The read sequencer 1130 is enabled to send an interleaved stream of the read data and commands, according to the requests received from the OpRAM, to zero or more data path units 1150-1 and 1150-2 and a write sequencer 1140.

The write sequencer 1140 is enabled to receive an interleaved stream of data and commands sent by the read sequencer 1130. The write sequencer 1140 is coupled to a writer 1120 to write the data, such as to the UBUF, the host interface, or the generic flash interface. The data is written according to the commands in the data stream received by the write sequencer 1140 (such as by the commands specifying an address and/or a length). The write sequencer 1140 is also coupled to the OpRAM (see FIG. 11A) to send status information, according to the received commands, about data that has been written. For example, status information is written into the OpRAM to indicate completion of writing a specified portion of the data stream (e.g., one 4 KB mapping unit).

The data path units 1150-1 and 1150-2 are enabled to transform the data while traveling between the read sequencer 1130 and the write sequencer 1140. Commands generated by the read sequencer 1130 in the data stream are optionally and/or selectively targeted to be received by one or more of the data path units 1150-1 and 1150-2 or the write sequencer 1140. Examples of the data path units 1150-1 and 1150-2 include:

- An encryption unit receiving a command comprising the salt (initialization vector) to be used for encryption, and encrypting the following data according to the salt. In further embodiments, the command also comprises a specification of an encryption key.
- A decryption unit receiving a command comprising the salt (initialization vector) to be used for the decryption, and decrypting the following data according to the salt. In further embodiments, the command also comprises a specification of a decryption key.
- A compression unit receiving a command indicating a start of a compression unit (e.g., mapping unit) boundary, and compressing the following data. In various embodiments, the command also comprises one or more of an amount of data to be compressed as a unit, a type of compression, a maximum run-time for the compression, and other compression controls.
- A decompression unit receiving a command indicating a start of a compression unit boundary, and decompressing the following data. In various embodiments, the command also comprises one or more of an amount of data to be decompressed as a unit, an expected size of the decompressed data, a type of decompression, a maximum run-time for the decompression, and other decompression controls.
- A cyclic redundancy check (e.g., CRC) unit receiving a command comprising the salt (initialization vector) to be used to compute a cyclic redundancy check value, and computing a cyclic redundancy check value over the following data according to the salt. In further embodiments, the command optionally and/or selectively enables the cyclic redundancy check unit to append a previously computed cyclic redundancy check value to previously received data covered by the cyclic redundancy check value.
- An error correction encoding and/or decoding unit receiving a command comprising a code rate and encoding and/or decoding the following data according to an error correcting code of that code rate. In further embodiments, the command optionally and/or selectively comprises additional controls, such as soft-decision processing information, a maximum number of iterations to use, and other encoder and/or decoder control information.

In an example operation, in response to receiving a write command from a host, a command list for a read sequencer of the host data path receive segment is built by the central processing unit, and, according to the command list, the host data path receive segment is enabled to transmit write data of the write command from the host to the unified buffer via the host interface. A data path unit in the host data path receive segment is enabled to compress the write data prior to the (compressed) write data being written to the unified buffer. Multiple (compressed) mapping units are enabled to be tightly packed in the unified buffer with no wasted space. The central processing unit is notified by status information written to OpRAM (via a write sequencer of the host data path receive segment) of the location and size of each of the (compressed) mapping units. The central processing unit is enabled to construct headers according to the status information, and to determine an amount of the headers and the (compressed) mapping units that fill one nonvolatile memory page. The central processing unit is further enabled to build a command list for a read sequencer of the flash data path transmit segment to transmit the nonvolatile memory page of headers and data to the nonvolatile memory. A data path unit in the flash data path transmit segment is enabled to encode the headers and data being sent to the nonvolatile memory, adding extra bytes for error correction coding protection to each of a plurality of read units. Upon receipt of status from a write sequencer of the flash data path transmit segment that the NVM page write is complete, space used in the unified buffer by the (compressed) mapping units is reclaimable (reusable).

In another example operation, in response to receiving a read command from a host, a command list for a read sequencer of the flash data path receive segment is constructed by the central processing unit, and, according to the command list, the flash data path receive segment is enabled to receive one or more read units read from the nonvolatile memory to the unified buffer via the generic flash interface. In some embodiments, a data path unit in the flash data path receive segment is enabled to decode the data being sent to the nonvolatile memory using the extra bytes for error correction coding protection with each read unit. In other embodiments, error correction happens via a separate data path segment (e.g., LDPC-D in FIG. 11A). The central processing unit is notified of receipt of the (corrected) data in the unified buffer by receipt of status from a write sequencer of the flash data path receive segment or, in other embodiments, a write sequencer of the LDPC-D data path segment. The central processing unit is further enabled to build a command list for the host data path transmit segment to transmit at least a portion of the corrected data from the unified buffer to the host via the host interface. A data path unit in the host data path transmit segment is enabled to decompress the corrected data prior to the transmitting to the host. Upon receipt of status from a write sequencer of the host data path transmit segment that the corrected data has been transmitted successfully, space used in the unified buffer by the corrected data is reclaimable (reusable).

Figure 11C:
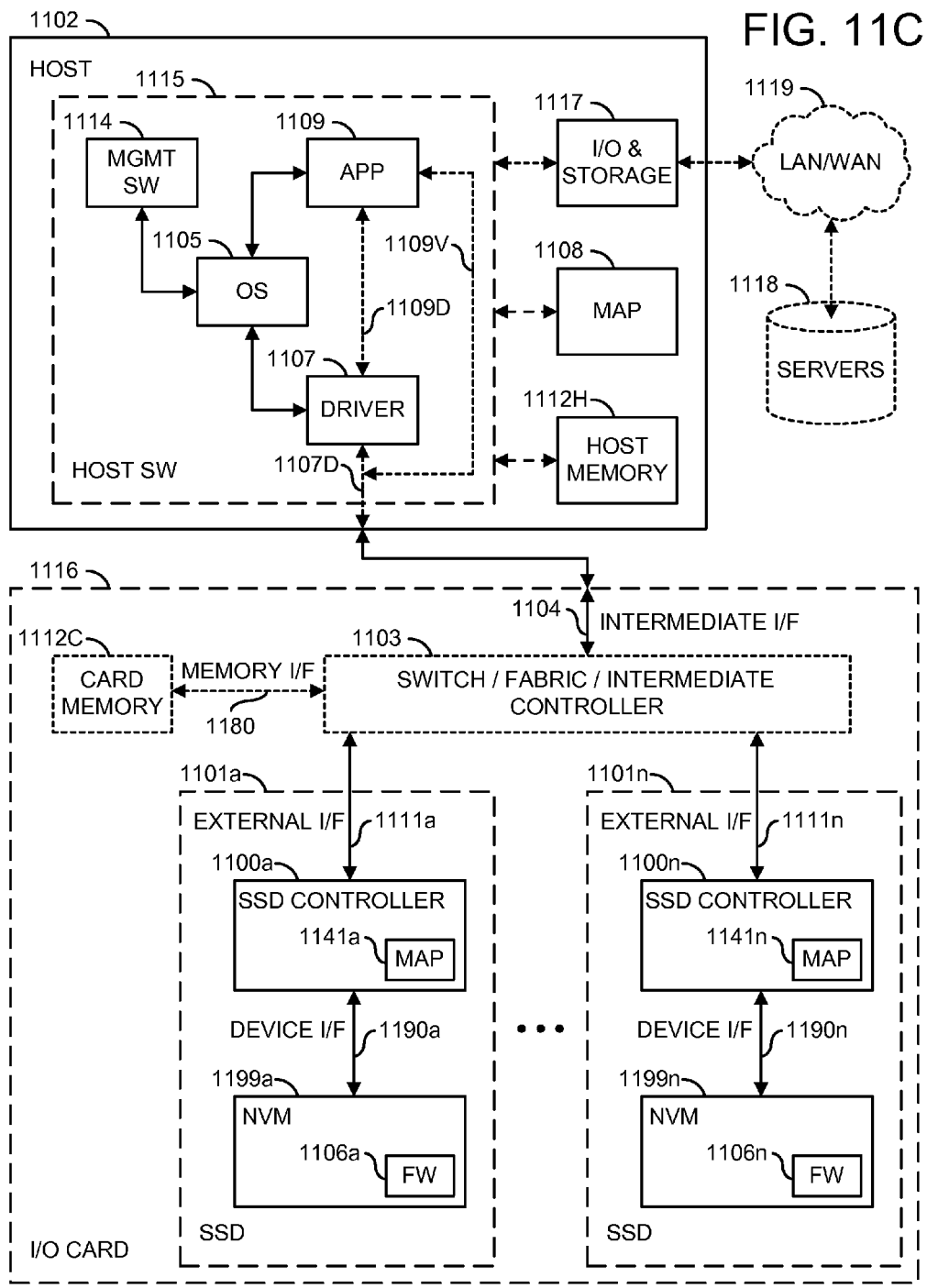
FIG. 11C is an illustration of selected details of various embodiments of the system in accordance with an embodiment of the invention.

Referring to FIG. 11C, an illustration of selected details of various embodiments of the system is shown in accordance with an embodiment of the invention. The embodiments generally include one or more instances of the solid-state drive controller 1100 of FIG. 11A. Several solid-state drives 1101a-1101n generally include solid-state drive controllers 1100a-1100n coupled to nonvolatile memories 1199a-1199n via device interfaces 1190a-1190n, respectively. The figure illustrates various classes of embodiments: a single solid-state drive coupled directly to a host 1102, a plurality of solid-state drives each respectively coupled directly to the host 1102 via respective external interfaces 1111a-1111n, and one or more solid-state drives coupled indirectly to the host 1102 via various interconnection elements.

As an example embodiment of a single solid-state drive coupled directly to a host, one instance of the solid-state drive 1101a is coupled directly to the host 1102 via an external interface 1111a (e.g., a switch/fabric/intermediate controller 1103 is omitted, bypassed, or passed-through). As an example embodiment of a plurality of solid-state drives each coupled directly to a host via respective external interfaces, each of a plurality of instances of the solid-state drives 1101a-1101n is respectively coupled directly to the host 1102 via a respective instance of external interfaces 1111a-1111n (e.g., switch/fabric/intermediate controller 1103 is omitted, bypassed, or passed-through). As an example embodiment of one or more solid-state drives coupled indirectly to a host via various interconnection elements, each of one or more instances of the solid-state drive 1101 is respectively coupled indirectly to the host 1102. Each indirect coupling is via a respective instance of the external interfaces 1111a-1111n coupled to a switch/fabric/intermediate controller 1103, and an intermediate interface 1104 coupling to the host 1102.

Some of the embodiments including the switch/fabric/intermediate controller 1103 also include a card memory 1112C coupled via a memory interface 1180 and accessible by the solid-state drives 1101a-1101n and/or by the host 102. In various embodiments, one or more solid-state drives 1101a-1101n, the switch/fabric/intermediate controller 1103, and/or the card memory 11120 are included on a physically identifiable module, card, or pluggable element (e.g., input/output card 1116). In some embodiments, a solid-state drive 1101a-1101n (or variations thereof) corresponds to a serial attached SCSI (e.g., SAS) drive or a serial advanced technology attachment (e.g., SATA) drive that is coupled to an initiator operating as the host 1102.

The host 1102 is enabled to execute various elements of host software 1115, such as various combinations of an operating system (e.g., OS) 1105, a driver 1107, an application 1109, and a multi-device management software 1114. A dotted-arrow 1107D is representative of bidirectional communication between the host software and the input/output device (e.g., data sent/received to/from one or more of the instances of the solid-state drives 1101a-1101n and from/to any one or more of operating system 1105 via the driver 1107, the driver 1107, and the application 1109 either via the driver 1107, or directly as a (e.g., PCIe) virtual function (e.g., VF)).

In some embodiments and/or usage scenarios, the host software 1115 includes some, all, or portions of a flash transition layer used with the solid-state drives 1101a-1101n. In an example, in various embodiments, the driver 1107 implements at least a portion of the flash transition layers used with the solid-state drives 1101a-1101n. In another example, in various embodiments, multi-device management software 1114 implements at least a portion of the flash transition layers used with the solid-state drives 1101a-1101n.

The operating system 1105 includes and/or is enabled to operate with drivers (illustrated conceptually by the driver 1107) for interfacing with the solid-state drives 1101a-1101n. Various versions of Windows (e.g., 95, 98, ME, NT, XP, 2000, Server, Vista, 7, and 8), various versions of Linux (e.g., Red Hat, Debian, and Ubuntu), and various versions of MacOS (e.g., 8, 9 and X) are examples of the operating system 1105. In various embodiments, the drivers are standard and/or generic drivers (sometimes termed "shrink-wrapped" or "pre-installed") operable with a standard interface and/or protocol such as SATA, advanced host controller interface (e.g., AHCI), or NVM Express, or are optionally customized and/or vendor specific to enable use of commands and/or flash transition layer specific to the solid-state drives 1101a-1101n. Some drives and/or drivers have pass-through modes to enable application-level programs, such as an application 1109 via optimized NAND access (sometimes termed ONA) or direct NAND access (sometimes termed DNA) techniques, to communicate commands directly to the solid-state drives 1101a-1101n, enabling a customized application to use commands and/or flash transition layers specific to the solid-state drives 1101a-1101n even with a generic driver. The ONA techniques include one or more of: use of nonstandard modifiers (hints); use of vendor-unique commands; communication of nonstandard statistics, such as actual nonvolatile memory usage according to compressibility; use of flash transition layer-specific protocols, such as communicating read unit addresses and spans, or such as communicating nonvolatile memory page addresses, offsets, and byte lengths; and other techniques. DNA techniques include one or more of: use of nonstandard commands or vendor-unique commands providing unmapped read, write, and/or erase access to the nonvolatile memory; use of nonstandard or vendor-unique commands providing more direct access to the nonvolatile memory, such as by bypassing formatting of data that the input/output device would otherwise do; and other techniques. Examples of the drivers are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. A dotted-arrow 1109D is representative of bidirectional communication between an application and an input/output device (e.g., bypass via a driver or bypass via a virtual function) for an application (e.g., an ONA-enabled application and an ONA-enabled driver communicating with a solid-state drive, such as without the application using the operating system as an intermediary.) A dotted-arrow 1109V is representative of bidirectional communications between an application and an input/output device (e.g., bypass via a virtual function) for an application (e.g., a DNA-enabled application and a DNA-enabled driver communicating with a solid-state drive, such as without the application using the operating system or the driver as intermediaries.)

One or more portions of the nonvolatile memories 1199a-1199n are used, in some embodiments, for firmware storage (e.g., firmware 1106a-1106n). The firmware storage includes one or more firmware images (or portions thereof). A firmware image has, for example, one or more images of firmware, executed (e.g., by the central processing unit of the solid-state drive controllers 1100a-1100n.) A firmware image has, for another example, one or more images of constants, parameter values, and nonvolatile memory device information, referenced for example by the central processing unit during the firmware execution. The images of firmware correspond, for example, to a current firmware image and zero or more previous (with respect to firmware updates) firmware images. In various embodiments, the firmware provides for generic, standard, ONA, and/or DNA operating modes, as well as operating with one or more flash transition layers. In some embodiments, one or more of the firmware operating modes are enabled, (e.g. one or more application program interfaces (e.g., APIs) are "unlocked" via keys or various software techniques, optionally communicated and/or provided by a driver.) In further embodiments, different ones of the firmware images are used for different ones of the operating modes and/or different ones of the flash transition layers.

In some embodiments, the host 1102 includes a map 1108 as a distinct hardware resource implementing a map. In other embodiments, a map is implemented partially or entirely via the map 1108 and/or a host memory 1112H and/or via a map 1141 in the solid-state drive controller 1100 and/or via the card memory 1112O. Examples of the map 1108, the host memory 1112H, the map 1141 in the solid-state drive controller 1100, and the card memory 1112C are one or more volatile and/or nonvolatile memory elements, such as implemented via DRAM, SRAM, and/or flash or other nonvolatile memory devices. Further examples of the host memory are system memory, host main memory, host cache memory, host-accessible memory, and input/output device-accessible memory. In some embodiments and/or usage scenarios (such as some embodiments having an input/output card 1116 and using the optional card memory 1112C of FIG. 11C as storage (for at least a portion of the map), one or more input/output devices and/or the host 1102 accesses the map in the card memory 1112C.

In various embodiments, the host 1102 and/or one or more of the instances of the solid-state drive 1101 are enabled to access the map 1108, the host memory 1112H, the card memory 1112C and/or the map 1141 to save and retrieve all or any portions of mapping information usable to convert logical block addresses (or other specifiers such as labels) to nonvolatile memory locations (such as block and/or page addresses and/or read unit addresses) targeting one or more portions of an input/output device nonvolatile memory, such as elements of one or more of the instances of the nonvolatile memory 1199a-1199n. Conceptually a single map may exist, and according to various embodiments control and/or storage and/or usage of the map is provided by one or more of the hosts 1102 and/or by the solid-state drive controllers 1100a-1100n.

In some embodiments lacking the switch/fabric/intermediate controller 1103, the solid-state drives 1101a-1101n are coupled to the host 1102 directly via the external interfaces 1111a-1111n. In various embodiments, the solid-state drive controllers 1100a-1100n are coupled to the host 1102 via one or more intermediate levels of other controllers, such as a RAID controller or an input/output controller. In some embodiments, the solid-state drives 1101a-1101n (or variations thereof) correspond to a SAS drive or a SATA drive and the switch/fabric/intermediate controller 1103 corresponds to an expander that is, in turn, coupled to an initiator or, alternatively, the switch/fabric/intermediate controller 1103 corresponds to a bridge that is indirectly coupled to an initiator via an expander. In some embodiments, the switch/fabric/intermediate controller 1103 includes one or more PCIe switches and/or fabrics.

In various embodiments, such as some of the embodiments with the host 1102 as a computing host (e.g., a computer, a workstation computer, a server computer, a storage server, a personal computer, a laptop computer, a notebook computer, a netbook computer, and/or a tablet computer), the computing host is optionally enabled to communicate (e.g., via optional input/output and storage devices/resources 1117 and optional local area network/wide area network (e.g., LAN/WAN) 1119) with one or more local and/or remote servers (e.g., optional servers 1118). The communication enables, for example, local and/or remote access, management, and/or usage of any one or more of the solid-state drive elements. In some embodiments, the communication is wholly or partially via Ethernet. In some embodiments, the communication is wholly or partially via Fibre Channel. The local area network/wide area network 1119 is representative, in various embodiments, of one or more local area networks and/or wide area networks, such as any one or more of a network in a server farm, a network coupling server farms, a metro-area network, and the Internet.

In various embodiments, a solid-state drive controller and/or a computing-host nonvolatile memory controller in combination with one or more nonvolatile memories are implemented as a nonvolatile storage component, such as a universal serial bus (e.g., USB) storage component, a universal flash storage (e.g., UFS) storage component, a compact flash (e.g., CF) storage component, a multimedia card (e.g., MMC) storage component, a secure digital (e.g., SD) storage component, a Memory Stick storage component, and an xD-picture card storage component.

In various embodiments, all or any portions of a solid-state drive controller (or a computing-host nonvolatile memory controller), or functions thereof, are implemented in a host that the controller is to be coupled with (e.g., the host 1102 of FIG. 11C). In various embodiments, all or any portions of a solid-state drive controller (or a computing-host nonvolatile memory controller), or functions thereof, are implemented via hardware (e.g., logic circuitry), software and/or firmware (e.g., driver software or solid-state drive control firmware), or any combination thereof.

Figure 12:
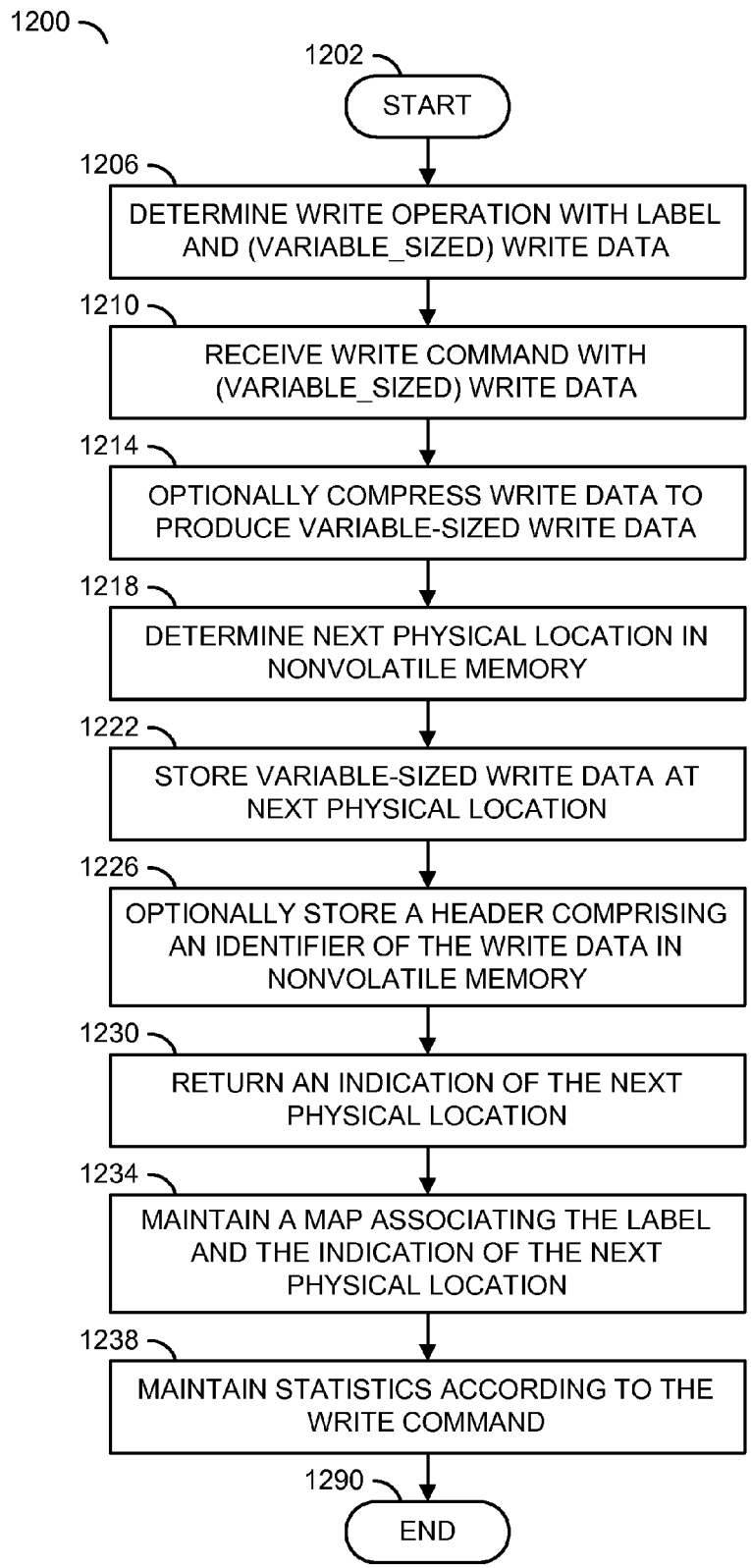
FIG. 12 is a flow diagram of writing data to a nonvolatile memory.

Referring to FIG. 12, a flow diagram 1200 of writing data to a nonvolatile memory is shown. The process starts in step 1202, and in step 1206 a determination is made to write (store) data associated with a particular one of a plurality of labels (or other unique identifiers, such as object identifications or logical block addresses) to a nonvolatile memory. For example, the determination is made by one or more of an application program, an operating system, a hypervisor, or any other software or firmware module. In some embodiments, the write data is variable-sized (e.g., possibly varying with each write operation). In other embodiments, the write data is a number of fixed-sized units, such as a number of SATA sectors.

In step 1210, a write command and the associated (possibly variable-sized) write data is received. In an example, an application sends a write command and write data (such as via a pointer to the data) to a driver using a system call. In another example, a host sends a write command to a solid-state drive controller along with information enabling the solid-state drive controller to retrieve the associated write data. For example, the write command includes a SATA native command queue (e.g., NCQ) tag, and the native command queue tag is used to fetch the associated write data.

In step 1214, the (possibly variable-sized) write data is optionally and/or selectively compressed or otherwise reduced in size. Even if the associated write data was variable-sized already, compression is possibly able to reduce a size of the associated write data further. In some embodiments, the (possibly variable-sized, possibly compressed) write data is optionally and/or selectively encrypted.

In step 1218, a next unwritten physical location (in a physical address space) of the nonvolatile memory for writing data is determined. In an example, the determined next unwritten physical location is immediately adjacent to previously-written, variable-size data (wasting no space in the nonvolatile memory). In another example, the determined next unwritten physical location starts in a same read unit as previously-written variable-sized data. In some embodiments, the determined next unwritten physical location is according to a band specified in the write command.

In step 1222, the (possibly variable-sized, possibly compressed) write data is stored in the nonvolatile memory at the determined next unwritten physical location. In some embodiments, a hardware unit tiles the (possibly variable-sized, possibly compressed) write data into an image of a nonvolatile memory page (e.g., a portion of a buffer that will be written to the nonvolatile memory page).

In step 1226, a header comprising an identifier of the write data is stored in a same nonvolatile memory page as at least a portion of the (possibly variable-sized, possibly compressed) write data. For example, the header is stored in a same nonvolatile memory page as at least a portion of the (possibly variable-sized, possibly compressed) write data as in FIG. 6, and/or the header is stored in a same read unit as at least a portion of the (possibly variable-sized, possibly compressed) write data as in FIG. 5. According to various embodiments, the identifier is one or more of: same as the particular label of the write data; a function of the particular label of the write data; an identifier associated with the particular label of the write data via a table; a unique identifier among all data stored in the nonvolatile memory; and any combination of the foregoing.

According to various embodiments, storing of the (possibly variable-sized, possibly compressed) write data and/or the header occurs in steps 1222 and/or 1226 and/or is deferred until a nonvolatile memory page of headers and data (such as from multiple write operations) is accumulated. In some embodiments, error correction encoding is performed as part of the storing to the nonvolatile memory. In further embodiments, the error correction encoding appends a number of error correction coding bytes to a user portion of each read unit to form the read units as stored in the nonvolatile memory. In still further embodiments, scrambling is performed prior to the error correction encoding.

In step 1230, an indication of the determined next unwritten physical location is returned. In an example, the indication of the determined next unwritten physical location comprises a read unit address, such as an address of a first one the read units used to store the (possibly variable-sized, possibly compressed) write data. Continuing the example, in some embodiments, the indication of the determined next unwritten physical location further comprises a number of read units spanned by the (possibly variable-sized, possibly compressed) write data, for example, a number of read units that must be read to retrieve all of and no more than the (possibly variable-sized, possibly compressed) write data. One or more of the number of read units optionally and/or selectively contains data associated with other ones of the labels, but each of the number of read units contains at least some of the (possibly variable-sized, possibly compressed) write data. In another example, the indication of the determined next unwritten physical location comprises an address of a nonvolatile memory page and/or an offset in a nonvolatile memory page used to store at least a portion of the (possibly variable-sized, possibly compressed) write data. Continuing the other example, in some embodiments, the indication of the determined next unwritten physical location further comprises a length in bytes of the (possibly variable-sized, possibly compressed) write data. Further continuing the other example, in still further embodiments, the (possibly variable-sized, possibly compressed) write data spans more than one nonvolatile memory page (e.g., starts in a first nonvolatile memory page and continues into one or more subsequent nonvolatile memory pages). For example, when a remaining amount of user data at and subsequent to the offset in the first nonvolatile memory page is less than the length in bytes of the (possibly variable-sized, possibly compressed) write data, the (possibly variable-sized, possibly compressed) write data spans more than one nonvolatile memory page.

In step 1234, a map is maintained associating the particular label with the indication of the determined next unwritten physical location. For example, maintaining the map enables the data associated with the particular label to be retrieved by a subsequent read operation.

In step 1238, statistics are maintained according to the write command. For example, writing the data associated with the particular label uses a certain amount of space in a redundancy block where the data was written and optionally and/or selectively freed a certain amount of space in a redundancy block where an older version of data associated with the particular label was stored. The statistics track an amount of used space (or equivalently in some embodiments, an amount of free space) in each redundancy block. The process ends in step 1290.

In some embodiments, locks (such as semaphores) are used to prevent access to at least a portion of the map during at least a portion of the process 1200. For example, in some embodiments, an entry of the map associated with the particular label is locked from the steps 1210 through 1234 to prevent other access to the entry while it is being updated.

Figure 13:
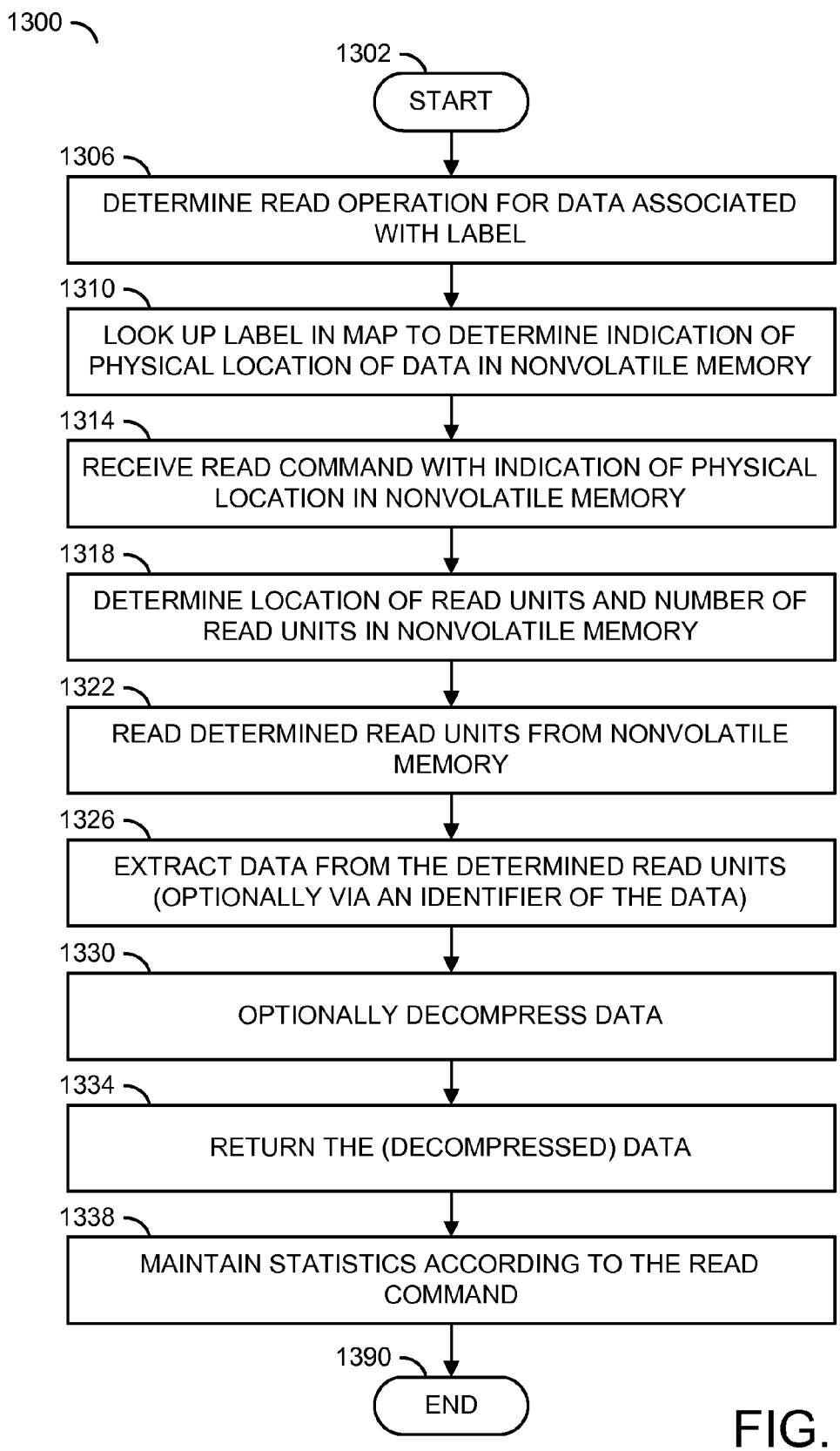
FIG. 13 is a flow diagram of reading data from a nonvolatile memory.

Referring to FIG. 13, a flow diagram 1300 of reading data from a nonvolatile memory is shown. The process starts in step 1302, and in step 1306 a determination is made to read (retrieve) data associated with a particular one of a plurality of labels (or other unique identifiers, such as object identifiers or logical block addresses) from a nonvolatile memory. For example, the determination is made by one or more of an application program, an operating system, a hypervisor, or any other software or firmware module. In some embodiments, the data is variable-sized (e.g., possibly varying with each read operation). In other embodiments, the data is a number of fixed-sized units, such as a number of SATA sectors.

In step 1310, the particular label is looked up in a map to determine an indication of a physical location in the nonvolatile memory of a stored version of the data associated with a label. According to various embodiments, the map look-up is performed by a software module originating the read operation, or by another software module invoked by the software module originating the read operation. For example, an application originates the read operation, and a driver layer on the host or a firmware layer on a solid-state drive controller performs the map look-up.

In step 1314, a read command with the indication of a physical location in the nonvolatile memory is received. In an example, after a driver layer on the host has performed the map look-up, the driver layer sends a read command and the indication of a physical location in the nonvolatile memory to a solid-state drive controller. In another example, after a first processor in a solid-state drive controller has performed the map look-up, the first processor sends a read command and the indication of a physical location in the nonvolatile memory to a second processor in the solid-state drive controller that controls access to the nonvolatile memory.

In step 1318, the indication of a physical location in the nonvolatile memory is used to determine a location and a number of read units in the nonvolatile memory that contain the stored version of the data associated with the particular label. In an example, the indication of the physical location comprises a read unit address, such as an address of a first one of one or more read units used to store the stored version of the data associated with the particular label. Continuing the example, in some embodiments, the indication of the physical location further comprises a number of the one or more read units, for example, a number of read units that must be read to retrieve all of and no more than the stored version of the data associated with the particular label. (One or more of the one or more read units optionally and/or selectively contains data associated with other ones of the labels, but each of the one or more read units contains at least some of the stored version of the data associated with the particular label.) In another example, the indication of the physical location comprises an address of a nonvolatile memory page and/or an offset in a nonvolatile memory page used to store at least a portion of the stored version of the data associated with the particular label. Continuing the other example, in some embodiments, the indication of the physical location further comprises a length in bytes of the stored version of the data associated with the particular label. Further continuing the other example, in still further embodiments, the stored version of the data associated with the particular label spans more than one nonvolatile memory page (e.g., starts in a first nonvolatile memory page and continues into one or more subsequent nonvolatile memory pages). For example, when a remaining amount of user data at and subsequent to the offset in the first nonvolatile memory page is less than the length in bytes of the stored version of the data associated with the particular label, the stored version of the data associated with the particular label spans more than one nonvolatile memory page. Further continuing the other example, according to a number of and/or a size of read units in the first nonvolatile memory page, and according to the offset and the length in bytes of the stored version of the data associated with the particular label, a first one of one or more of the read units in the first nonvolatile memory page and a number of the read units in the first nonvolatile memory page are determined. If the stored version of the data associated with the particular label spans more than one nonvolatile memory page, a similar procedure is used with one or more subsequent ones of the nonvolatile memory pages to determine additional read units in the subsequent nonvolatile memory pages that contain at least a portion of the stored version of the data associated with the particular label.

In step 1322, the determined read units are read from the nonvolatile memory. In some embodiments, error correction decoding is performed on the read units to correct any errors occurring during storage in and/or transfer to or from the nonvolatile memory. In further embodiments, de-scrambling is performed subsequent to the error correction decoding. Due to error correction encoding of the determined read units, a number of bytes determined to be read from the nonvolatile memory includes both the user data in the read units and error correction coding bytes in each of the read units. In some embodiments, a number of the error correction coding bytes in each of the read units varies dynamically, such as under control of the solid-state drive controller due to wear of the nonvolatile memory. In various embodiments and/or usage scenarios, a total number of bytes of user data in the determined read units exceeds the length in bytes of the stored version of the data associated with the particular label, such as when at least one of the determined read units contains at least a portion of data associated with another one of the labels.

In step 1326, the stored version of the data associated with the particular label is extracted from the determined read units. In some embodiments, the extracting is according to an identifier provided with the read command. According to various embodiments, the identifier is one or more of: same as the particular label of the data; a function of the particular label of the data; an identifier associated with the particular label of the data via a table; a unique identifier among all data stored in the nonvolatile memory; and any combination of the foregoing. In an example, the read units comprise one or more headers, as illustrated in FIG. 5, and the identifier is used to determine a matching one of the headers, which is then used to locate the stored version of the data associated with the particular label in the determined read units. In another example, the indication of the physical location comprises information specifying a location of the stored version of the data associated with the particular label within the determined read units. According to various embodiments, the stored version of the data associated with the particular label is variable-sized. For example, the data associated with the particular label was compressed prior to being stored, and/or the data associated with the particular label was itself variable-sized.

In step 1330, the stored version of the data associated with the particular label is optionally and/or selectively decrypted, and/or optionally and/or selectively decompressed to produce the data associated with the particular label.

In step 1334, the data associated with the particular label is returned in response to the read operation.

In step 1338, statistics are maintained according to the read command. In an example, the read command accessed a certain number of nonvolatile memory blocks to retrieve the determined read units, and statistics are maintained counting a number of read disturb events per nonvolatile memory block. In another example, the read command accessed a certain number of nonvolatile memory blocks to retrieve the determined read units, error correction of the determined read units corrected a respective number of errors in each of the determined read units, and statistics are maintained of a maximum number of errors corrected in any read unit in each of the nonvolatile memory blocks. The process ends in step 1390.

Typically for reading data of a single mapping unit that does not span multiple nonvolatile memory pages, a number of read units to access in a nonvolatile memory page to obtain the stored version of the data of the mapping unit is less than all of the read units in the nonvolatile memory page. Furthermore, as the stored version of the data of the mapping unit is variable-sized, a number of read units to access in the nonvolatile memory page for a first read command referencing a first logical block address (or label) is different from a number of read units to access in the nonvolatile memory page for a second read command referencing a second logical block address (or label), the second logical block address being different from the first logical block address. In some embodiments, solely the number of read units to access in the nonvolatile memory page are read from the nonvolatile memory page. That is, only ones of the read units that contain a portion of the stored version of the data of the mapping unit are read from the nonvolatile memory in order to access and retrieve the stored version of the data of the mapping unit.

Figure 14:
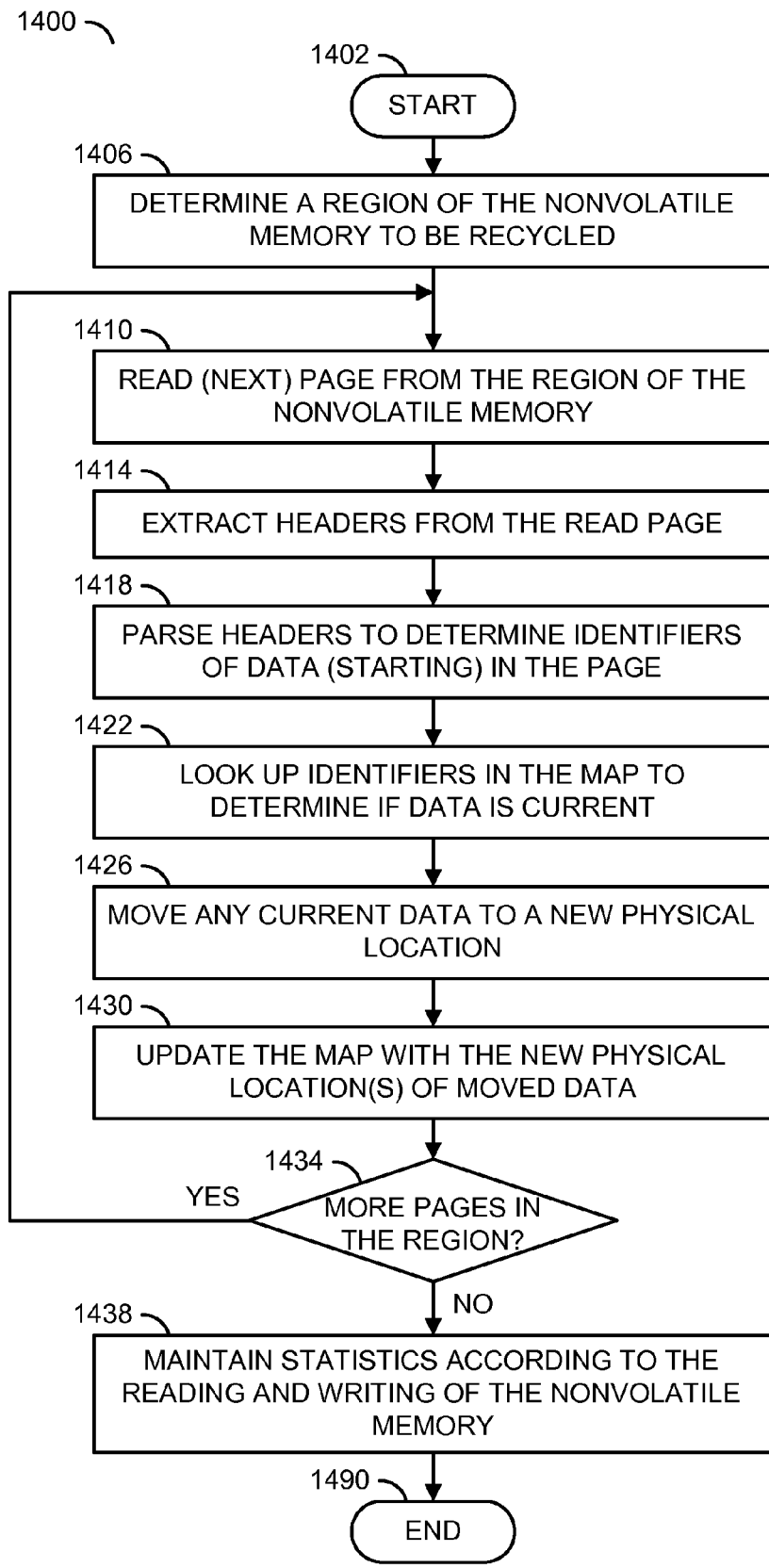
FIG. 14 is a flow diagram of recycling data in a nonvolatile memory.

Referring to FIG. 14, a flow diagram of recycling data in a nonvolatile memory is shown. The process starts in step 1402, and in step 1406 a determination is made as to a region of the nonvolatile memory to be recycled. According to various embodiments and/or usage scenarios, the region is one or more of: a redundancy block; one or more nonvolatile memory blocks; a portion of the nonvolatile memory over which free and/or used space statistics are maintained; a portion of the nonvolatile memory over which wear-leveling statistics are maintained; and any combination of the foregoing. According to various embodiments and/or usage scenarios, recycling is performed to one or more of: garbage collection (aggregate free space) in the nonvolatile memory; wear-leveling the nonvolatile memory (to keep the blocks of the nonvolatile memory relatively equal in a respective program/erase count); and process errors and/or exceptions related to the nonvolatile memory, such as program failures, excessive read disturbs, and/or excessive error rates. In further embodiments, recycling is performed globally, such as across a plurality of solid-state drives, by a host.

In step 1410, one or more nonvolatile memory pages are read from the region of the nonvolatile memory. In some embodiments, the nonvolatile memory pages are error corrected in entirety. All of the read units in the nonvolatile memory pages are error corrected. In other embodiments, only a portion of the nonvolatile memory pages determined to contain headers (such as illustrated in FIG. 6) is at first error corrected, and further portions of the nonvolatile memory pages are error corrected as needed if it is determined (e.g., step 1426) that the nonvolatile memory pages contain data that needs to be recycled.

In step 1414, headers are extracted from the nonvolatile memory pages. In an example, in an embodiment such as illustrated in FIG. 5, headers are extracted from each read unit in each of the nonvolatile memory pages. In another example, in an embodiment such as illustrated in FIG. 6, headers are extracted from a portion of each of the nonvolatile memory pages, such as a first one or more read units in each of the nonvolatile memory pages.

In step 1418, the headers extracted from the nonvolatile memory pages are parsed to determine the identifiers of data associated with (e.g., starting) in the nonvolatile memory pages.

In step 1422, the identifiers are looked up in a map to determine respective indications of physical locations in the nonvolatile memory of the data associated with the identifiers. In some embodiments, the identifiers are same as respective labels of data used when the nonvolatile memory was written. In other embodiments, the identifiers are combined with other information, such as a solid-state drive identifier, to form labels that are looked up in the map. In still other embodiments, a map is maintained associating the identifiers with the labels, and/or associating the identifiers with the indications of physical locations in the nonvolatile memory of the data associated with the identifiers.

In step 1426, any data associated with the identifiers that is still current (in the nonvolatile memory pages being recycled) is written to a new physical location in the nonvolatile memory. For example, the respective indications of physical locations in the nonvolatile memory of the data associated with the identifiers are converted to respective read unit addresses, and if the respective read unit addresses are in the nonvolatile memory pages being recycled, then the nonvolatile memory pages being recycled contain the most recent version of the data associated with the identifiers. In various embodiments, writing the still-current data associated with the identifiers to a new physical location in the nonvolatile memory is performed similarly to steps 1218 to 1230 of the process 1200. In various embodiments, if the still-current data is compressed and/or encrypted, the still-current data is rewritten "as is" in the compressed and/or encrypted form. In some embodiments, the still-current data is moved from the nonvolatile memory page being recycled to a new nonvolatile memory page within the solid-state drive controller (and the still-current data is not sent to a host in order to recycle the still-current data). In other embodiments, recycling comprises sending the still-current data to the host and rewriting it similarly to the process 1200. In further embodiments, recycling is performed globally across a plurality of solid-state drives, and still-current data previously stored on one of the solid-state drives is rewritten for purposes of recycling to another one of the solid-state drives.

In step 1430, the map is updated to reflect an indication of the new physical location of any data that has been recycled.

In step 1434, a determination is made whether more nonvolatile memory pages are still to be processed in the region. If so, the process goes to step 1410 to continue recycling further nonvolatile memory pages.

In step 1438, statistics are maintained according to the reading and writing of the nonvolatile memory during the recycling process. In an example, reading the nonvolatile memory accesses a certain number of nonvolatile memory blocks to retrieve the nonvolatile memory pages, and statistics are maintained counting a number of read disturb events per nonvolatile memory block. In another example, reading the nonvolatile memory accesses a certain number of nonvolatile memory blocks to retrieve the nonvolatile memory pages, error correction of the nonvolatile memory pages correct a respective number of errors in each of the read units of the nonvolatile memory pages that were error correction decoded, and statistics are maintained of a maximum number of errors corrected in any read unit in each of the nonvolatile memory blocks. In yet another example, recycling the data by writing nonvolatile memory uses a certain amount of space in a redundancy block where the recycled data was written, and optionally and/or selectively frees a certain amount of space in the redundancy block being recycled. The statistics track an amount of used space (or equivalently in some embodiments, an amount of free space) in each redundancy block. In some embodiments, when the amount of used space in the region being recycled goes to zero, no more still-current (not already over-written) data in the region is being recycled, and process 1400 is able to complete prior to reading all of the nonvolatile memory pages in the region being recycled. The process ends in step 1490.

In some embodiments, locks (such as semaphores) are used to prevent access to at least a portion of the map during at least a portion of the process 1400. For example, in some embodiments, an entry of the map associated with one of the identifiers having current data is locked from steps 1422 through 1430 to prevent other access to the entry while it is being updated.

According to various embodiments, the host selects regions of the nonvolatile memory to be recycled; the solid-state drive controller selects regions of the nonvolatile memory to be recycled; the host selects regions of the nonvolatile memory to be recycled for a first reason and the solid-state drive controller selects regions of the nonvolatile memory to be recycled for a second different reason; and any combination of the foregoing. In an example, all selections of regions of the nonvolatile memory to be recycled are performed on the host. In another example, the host selects regions of the nonvolatile memory to be recycled for garbage collection and the solid-state drive controller selects regions of the nonvolatile memory to be recycled for wear-leveling. In yet another example, the host selects regions of the nonvolatile memory to be recycled for garbage collection and wear-leveling, and the solid-state drive controller selects regions of the nonvolatile memory to be recycled for exceptional conditions and/or errors such as program failures, excessive error correction coding errors; or read disturb events. In further embodiments, the solid-state drive controller is enabled to communicate one or more statistics of the nonvolatile memory, such as program/erase counts and/or used space statistics, to the host. For example, the statistics are communicated as logs, such as SMART logs, through a reserved portion of a logical block address space of the solid-state drive controller, or by special commands to read and/or write the statistics. In some embodiments and/or usage scenarios, communicating the statistics to the host enables the host to select regions of the nonvolatile memory to be recycled, while the solid-state drive controller is enabled to offload maintaining of the statistics from the host.

In some embodiments, the solid-state drive controller is enabled to recycle at least a portion of the nonvolatile memory independent of the host, and to communicate updated physical locations to the host. For example, in response to exceptional conditions and/or errors such as program failures, excessive error correction coding errors, or read disturb events, the solid-state drive controller determines a region of the nonvolatile memory that must be recycled. The solid-state drive controller reads headers in the region of the nonvolatile memory and relocates any still-current data in the region of the nonvolatile memory to respective new physical locations in a different portion of the nonvolatile memory. According to various embodiments, in one or more implementations: the solid-state drive maintains the map and is able to update the map to reflect the respective new physical locations of the still-current data; the solid-state drive controller maintains a separate partial map of data relocated by the solid-state drive controller, the separate partial map associating indications of physical locations of the still-current data in the region of the nonvolatile memory with the respective new physical locations; the solid-state drive controller communicates the respective new physical locations along with information from the headers, such as respective identifiers of the still-current data, to the host and the host updates the map; and any combination of the foregoing. Advantageously, the still-current data is accessible in both the region of the nonvolatile memory and the respective new physical locations until the region of the nonvolatile memory is erased. In further embodiments, the region of the nonvolatile memory is not erased until after the map is updated with the respective new physical locations. For example, the solid-state drive controller is informed by the host that the map has been updated, and only then is the solid-state drive controller enabled to erase the region of the nonvolatile memory.

In various embodiments, the host controls the reading of the nonvolatile memory pages from the nonvolatile memory for recycling (step 1410) such as by requesting a number of the nonvolatile memory pages to be read, or a number of extracted headers to be sent to the host. According to various embodiments, the host performs at least some of the header parsing (step 1418) and/or the solid-state drive controller performs at least some of the header parsing, such as by pre-processing and/or reformatting and/or filtering the extracted headers. In further embodiments, the host performs the map look-up (step 1422) and determines if any of the data needs to be rewritten. The rewriting (step 1426) is performed by the solid-state drive controller under control of the host, such as by the host sending a "rewrite" command for any still-current data. The rewrite command is similar to a write command, but rather than having write data, the rewrite command comprises an indication of a physical location in the nonvolatile memory (the location from which the data is being recycled) as would a read command. Similar to a write command, the rewrite command returns an indication of the new physical location of the rewritten data, and the host performs step 1430 to update the map. In related embodiments in which the host performs a larger portion of the process 1400, the rewrite command comprises a buffer location in the solid-state drive controller of the still-current data.

In some embodiments, nonstandard and/or vendor-unique commands are used as part of a communication protocol between the host and the solid-state drive controller. According to various embodiments, the communication protocol is one or more of: SATA, small computer system interface (e.g., SCSI), SAS, peripheral component interconnect express (e.g., PCIe), NVM Express (nonvolatile memory), SCSI Over PCIe (e.g., SOP), Mobile Express, USB, UFS, embedded multimedia card (e.g., eMMC), Ethernet, Fibre Channel, or any other protocol suitable for communication between two electronic devices. In an example, communication of an indication of a physical location between the host and the solid-state drive controller uses vendor-unique commands, such as vendor-unique versions of standard read and write commands. In another example, extracted headers for recycling are communicated from the solid-state drive controller to the host in log pages (such as SMART log pages). In still another example, extracted headers are treated similarly to read data, but are read with a vendor-unique "read extracted headers" command.

According to various embodiments, any of the steps of the process 1200 and/or of the process 1300 and/or of the process 1400 are performed by one or more of: a host coupled to a solid-state drive controller; a solid-state drive controller coupled to a host; and any combination of the foregoing. In an example, map look-up and map maintenance is performed on the host. In another example, determination of a number of read units is performed on either or both of the host and the solid-state drive controller. In yet another example, tiling write data into the nonvolatile memory pages (e.g., step 1222) is performed on the solid-state drive controller. In an example, write data is tiled into the nonvolatile memory page images in a buffer of the solid-state drive controller under control of the host. In another example, extracting data from read units (e.g., step 1326) is performed on the solid-state drive controller. In still another example, compressing (e.g., step 1214) and decompressing (e.g., step 1330) are performed on the solid-state drive controller. In an example, statistics are maintained (e.g., step 1238 or step 1338) on the solid-state drive controller. In another example, determining regions of the nonvolatile memory to recycle (e.g., step 1406) is performed on the host. In yet another example, moving still-current data to be recycled from an old location to a new location (e.g., step 1426) is performed on the solid-state drive controller.

In some embodiments, the host and/or the solid-state drive controller maintains a table associating each of a plurality of regions of the nonvolatile memory with specified properties and/or features. In an example, the table associates each of the regions of the nonvolatile memory with a particular one of a plurality of code rates (error correction code strengths), enabling an amount of data stored in each of the regions to vary according to a "health" of each of the regions. Healthier regions use a higher (weaker) code rate and are enabled to store more user data, and weaker regions use a lower (stronger) code rate and are enabled to store less user data (but are enabled to correct more errors). In another example, the table indicates ones of the regions that are defective or have failed and should not be used. For example, with NAND flash, some of a plurality of blocks of the NAND flash are defective even when the NAND flash is new, and others of the blocks possibly fail during a lifetime of the NAND flash. The table indicates blocks that must be skipped when sequentially writing (e.g., striping) data across a plurality of NAND flash devices.

In some embodiments, a higher-level portion of the map is maintained on the host, and a lower-level portion of the map is maintained on the solid-state drive controller. The higher-level portion of the map associates labels (or logical block addresses) with respective indications of physical locations in the nonvolatile memory. The indications of physical locations in the nonvolatile memory are then further translated by the solid-state drive controller using the lower-level portion of the map to determine physical portions of the nonvolatile memory to be read and/or written. From a perspective of the host, the indications of physical locations act as opaque handles in that the solid-state drive controller assigns one of the indications of physical locations to a particular data object on write, and the solid-state drive controller is enabled to return the particular data object when given back the corresponding indication of physical location. Stated another way, knowledge of specifics of user data organization within the nonvolatile memory is hidden from the host. Advantageously, the solid-state drive controller is enabled to perform at least some management of the nonvolatile memory, such as selecting code rates, or determining bad blocks or other portions of the nonvolatile memory that are unused by the host.

In an example, when a particular one of a plurality of blocks of the nonvolatile memory is first used, the solid-state drive controller divides each of a plurality of pages of the particular block into multiple (e.g., eight) respective read units and uses a particular one of a plurality of code rates for error correction of the particular block. Later, when the particular block is reused after it is more worn, the solid-state drive controller divides each of the plurality of pages of the particular block into multiple (e.g., seven) respective read units and uses a stronger one of the code rates for error correction of the particular block. In both cases, when the host writes data that gets stored in the particular block, an indication of a physical location in the particular block is independent of a number of read units into which the pages of the particular block are divided.

In another example, when variable-sized data spans multiple ones of a plurality of blocks of the nonvolatile memory, indications of physical locations used by the host are independent of knowledge of whether any particular block of the nonvolatile memory is in use or has been marked as bad and is unused. Continuing the other example, suppose block 7 of a particular one of a plurality of die of the nonvolatile memory is bad and is unused. When data in block 6 of a previous one of the die spans to a subsequent block, the solid-state drive controller uses block 6 of the particular die. When data in block 7 of the previous die spans to a subsequent block, the solid-state drive controller skips block 7 of the particular die and continues the data in block 7 of a next one of the die. The host has no knowledge as to which of the blocks the data spans.

According to various embodiments, background operations such as read scrub and recycling are performed by one or more of the host, the solid-state drive controller, and any combination thereof.

According to various embodiments, any operations of the host and/or of a processor of the solid-state drive controller are performed by any of one or more central processing units, by one or more hardware units, and/or by any combination of the foregoing.

According to various embodiments, a host and/or a solid-state drive controller are enabled to use one or more of: a traditional flash transition layer; a variable-size flash transition layer; a sequential read optimized variable-size flash transition layer; any other type of flash translation layer, direct access to the nonvolatile memory, any combination of the foregoing in different physical portions of the nonvolatile memory; any combination of the foregoing in different logical portions of a logical address space of the solid-state drive controller; raw physical access to the nonvolatile memory; and any combination of the foregoing.

According to various embodiments, host write data is optionally and/or selectively encrypted prior to being written to the nonvolatile memory, and optionally and/or selectively decrypted after being read from the nonvolatile memory. In further embodiments, encryption happens subsequent to optional and/or selective compression of the host write data, and decryption happens prior to optional and/or selective decompression of data being read to return to the host.

While several example embodiments herein have used the solid-state drives and the solid-state drive controllers, the techniques described are generally applicable to other input/output devices and/or data storage devices such as hard disk drives. The nonvolatile memory used in such input/output devices is, in various embodiments, other than "solid-state"

nonvolatile memory, such as the magnetic platters of hard disk drives (e.g., hard disk drives using shingled magnetic recording).

In some embodiments, various combinations of all or portions of operations performed by a multi-node storage device or portion(s) thereof, for instance a hard disk drive or a solid-state disk or a nonvolatile memory controller of an input/output device enabled for interoperation with a processor (such as a CPU), an input/output controller (such as a RAID-on-chip die), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include, but are not limited to: Verilog, VHDL (very high speed integrated circuit hardware description language), SPICE (simulation program with integrated circuit emphasis), SPICE variants such as PSpice, IBIS (input/output buffer information specification), LEF (library exchange format), DEF (design exchange format), GDS-II (graphic database system-II), OASIS (open artwork system interchange standard), or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method of storing data utilizing a partitioned flash translation layer comprising the steps of:
   receiving, first data to be written from a host; and
   storing second data generated from the first data in a memory, wherein the first data is compressed to generate the second data, the second data has a size that is variable, the second data is stored among a plurality of physical locations in the memory, an initial physical location of the plurality of physical locations that hold the second data is a next unwritten location in the memory, the size of the second data is stored in a first partition of the flash translation layer local to the memory, and the initial physical location of the second data in the memory is stored in a second partition of the flash translation layer in the host.

2. The method according to claim 1, further comprising the steps of:
   receiving a read command having the initial physical location of the second data from the host;
   reading the size of the second data from the first partition of the flash translation layer; and
   retrieving the second data by reading a portion of the memory based on the initial physical location and the size of the second data.

3. The method according to claim 2, further comprising the steps of:
   recreating the first data by decompressing the second data as retrieved from the memory; and
   returning the first data as recreated to the host.

4. The method according to claim 1, further comprising the step of:
   storing an identifier associated with the first data in the memory as at least a portion of a header associated with the second data.

5. The method according to claim 4, further comprising the step of:
   maintaining a map in the host, wherein the map associates the identifier with the initial physical location of the second data in the memory.

6. The method according to claim 4, wherein the identifier is a logical block address, the initial physical location is an address within one of a plurality of read units in the memory that hold the second data, and each of the plurality of read units comprises a respective portion of the second data and a respective error correction information that protects the respective portion of the second data.

7. The method according to claim 6, wherein the memory has a plurality of pages, the address is in a first page of the plurality of pages that hold the second data, the first page includes a first number of the plurality of read units that hold the second data, a second page of the plurality of pages includes a second number of the plurality of read units that hold the second data, and the first number is different from the second number.

8. The method according to claim 1, wherein the next unwritten location adjoins previously written data in a physical address space of the memory.

9. A method of storing data utilizing a partitioned flash translation layer, comprising the steps of:
   receiving the data to be written from a host, wherein the data has a size that is variable; and
   storing the data in a memory, wherein the data is stored among a plurality of physical locations in the memory, an initial physical location of the plurality of physical locations that hold the data is a next unwritten location in the memory, the size of the data is stored in a first partition of the flash translation layer local to the memory, and the initial physical location of the data in the memory is stored in a second partition of the flash translation layer in the host.

10. The method according to claim 9, further comprising the steps of:
    receiving a read command having the initial physical location in the memory that holds the data from the host;
    reading the size of the data from the first partition of the flash translation layer; and
    retrieving the data by reading a portion of the memory based on the initial physical location and the size of the data.

11. The method according to claim 10, further comprising the step of:
    returning the data to the host.

12. The method according to claim 9, further comprising the step of:
    storing an identifier associated with the data in the memory as at least a portion of a header associated with the data.

13. The method according to claim 12, further comprising the step of:
    maintaining a map in the host, wherein the map associates the identifier with the initial physical location of the data in the memory.

14. The method according to claim 12, wherein the identifier is a logical block address, the initial physical location is an address within one of a plurality of read units in the memory that hold the data, and each of the plurality of read units comprises a respective portion of the data and a respective error correction information that protects the respective portion of the data.

15. The method according to claim 14, wherein the memory has a plurality of pages, the address is in a first page of the plurality of pages that hold the data, the first page includes a first number of the plurality of read units that hold the data, a second page of the plurality of pages includes a second number of the plurality of read units that hold the data, and the first number is different from the second number.

16. The method according to claim 9, wherein the next unwritten location adjoins previously written data in a physical address space of the memory.

17. An apparatus comprising:
    an interface configured to process a plurality of read/write operations to/from a memory; and
    a control circuit configured to receive first data from a host, and store second data generated from the first data in the memory, wherein the first data is compressed to generate the second data, the second data has a size that is variable, the second data is stored among a plurality of physical locations in the memory, an initial physical location of the plurality of physical locations that hold the second data is a next unwritten location in the memory, the size of the second data is stored in a first partition of a flash translation layer local to the memory, and the initial physical location of the second data in the memory is stored in a second partition of the flash translation layer in the host.

18. The apparatus according to claim 17, wherein the interface and the control circuit are part of a solid-state drive controller.

19. The method according to claim 1, wherein the steps are performed in a solid-state drive controller.

20. The method according to claim 9, wherein the steps are performed in a solid-state drive controller.

* * * * *